United States Patent
Linkola et al.

(10) Patent No.: US 11,652,559 B2
(45) Date of Patent: May 16, 2023

(54) METHOD AND SYSTEM FOR WI-FI FIELD-TO-LAB TESTING

(71) Applicant: SPIRENT COMMUNICATIONS, INC., San Jose, CA (US)

(72) Inventors: Janne Linkola, Lexington, MA (US); Michael Haley, Marlboro, MA (US)

(73) Assignee: SPIRENT COMMUNICATIONS, INC., San Jose, CA (US)

( * ) Notice: Subject to any disclaimer, the term of this patent is extended or adjusted under 35 U.S.C. 154(b) by 0 days.

(21) Appl. No.: 17/452,880

(22) Filed: Oct. 29, 2021

(65) Prior Publication Data
US 2022/0140919 A1 May 5, 2022

Related U.S. Application Data

(60) Provisional application No. 63/106,940, filed on Oct. 29, 2020.

(51) Int. Cl.
*H04W 24/06* (2009.01)
*H04B 17/10* (2015.01)
(Continued)

(52) U.S. Cl.
CPC ......... *H04B 17/103* (2015.01); *H04B 17/318* (2015.01); *H04B 17/391* (2015.01); *H04W 16/20* (2013.01)

(58) Field of Classification Search
CPC .. H04B 17/103; H04B 17/318; H04B 17/391; H04B 17/3912; H04B 17/104; H04W 16/20; H04W 24/08; H04W 24/04
See application file for complete search history.

(56) References Cited

U.S. PATENT DOCUMENTS

2005/0053008 A1* 3/2005 Griesing ................. H04L 43/50
370/241
2006/0239198 A1* 10/2006 Mlinarsky ............. H04W 24/00
370/252
(Continued)

OTHER PUBLICATIONS

Fundamentals of wireless test part 1: Range and Roaming test by Fanny Mlinarsky, (https://www.edn.com/fundamentals-of-wireless-test-part-1-range-and-roaming-test/) Sep. 25, 2012 (Year: 2012).*

*Primary Examiner* — Edan Orgad
*Assistant Examiner* — Malick A Sohrab
(74) *Attorney, Agent, or Firm* — Haynes Beffel & Wolfeld, LLP; Ernest J. Beffel, Jr.

(57) ABSTRACT

Path-loss measurements are determined for a test client device moving along a path in a field test environment in which field Wi-Fi mesh network nodes are distributed. The path-loss measurements are reproduced in a field-to-lab test environment that includes a test client device disposed in an electromagnetically-isolated chamber and field test Wi-Fi mesh network nodes disposed in respective electromagnetically-isolated chambers. The test client device and the field test Wi-Fi mesh network nodes are in wired or wireless communication with each other via signal lines. A programmable attenuator is electrically coupled to each signal line. The attenuation of each programmable attenuator is varied to reproduce the path-loss measurements from the field test environment. Path-loss measurements at the location of each field Wi-Fi mesh network node are also reproduced with the programmable attenuators to reproduce the field Wi-Fi mesh network node configuration.

20 Claims, 18 Drawing Sheets

(51) Int. Cl.
    *H04W 16/20*     (2009.01)
    *H04B 17/318*     (2015.01)
    *H04B 17/391*     (2015.01)

(56) References Cited

U.S. PATENT DOCUMENTS

| | | | | |
|---|---|---|---|---|
| 2015/0109941 A1* | 4/2015 | Zhang | ............ | H04W 24/06 |
| | | | | 370/252 |
| 2016/0373944 A1* | 12/2016 | Jain | ............ | H04L 65/80 |
| 2017/0135145 A1* | 5/2017 | Amini | ............ | H04L 45/20 |

* cited by examiner

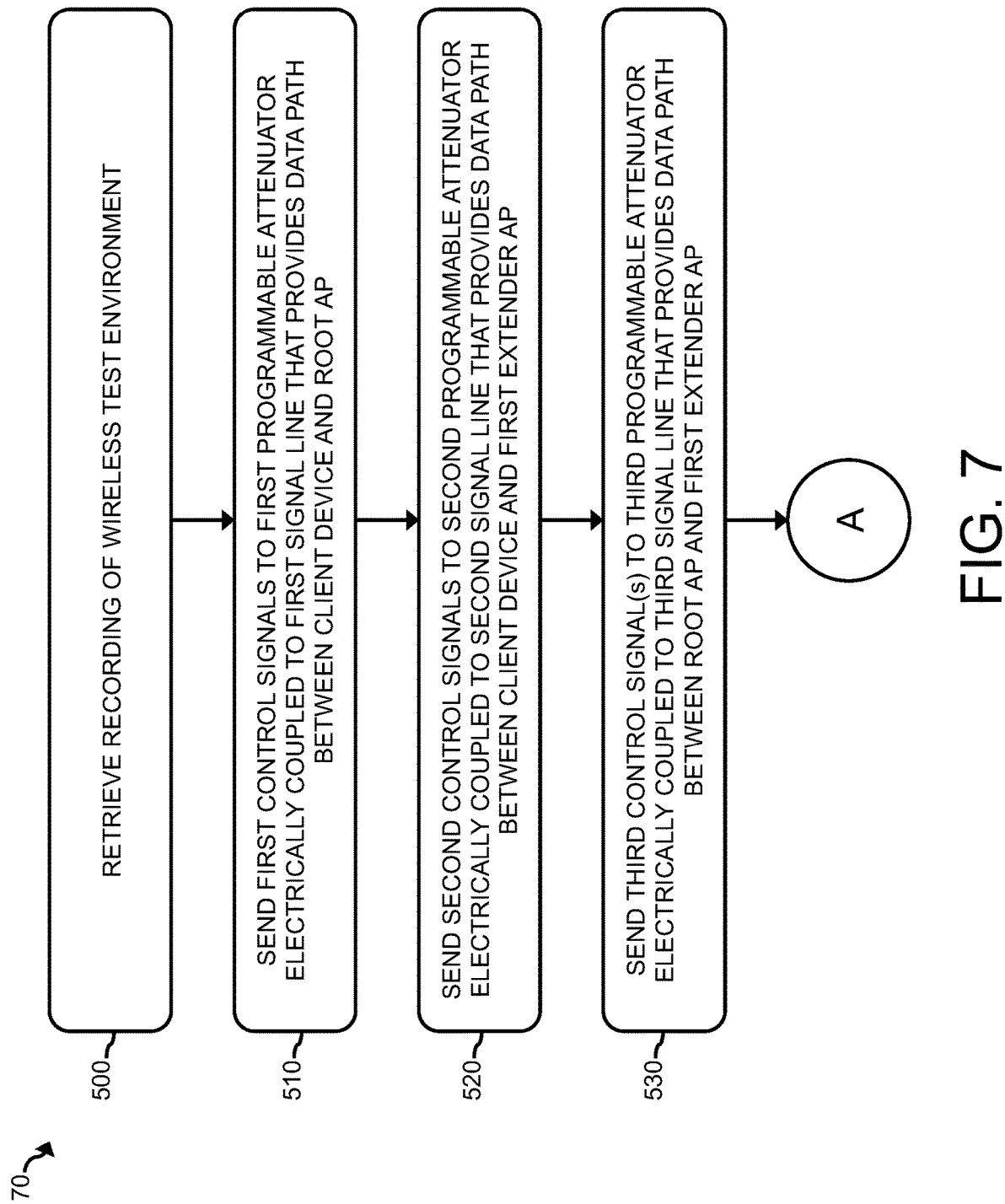

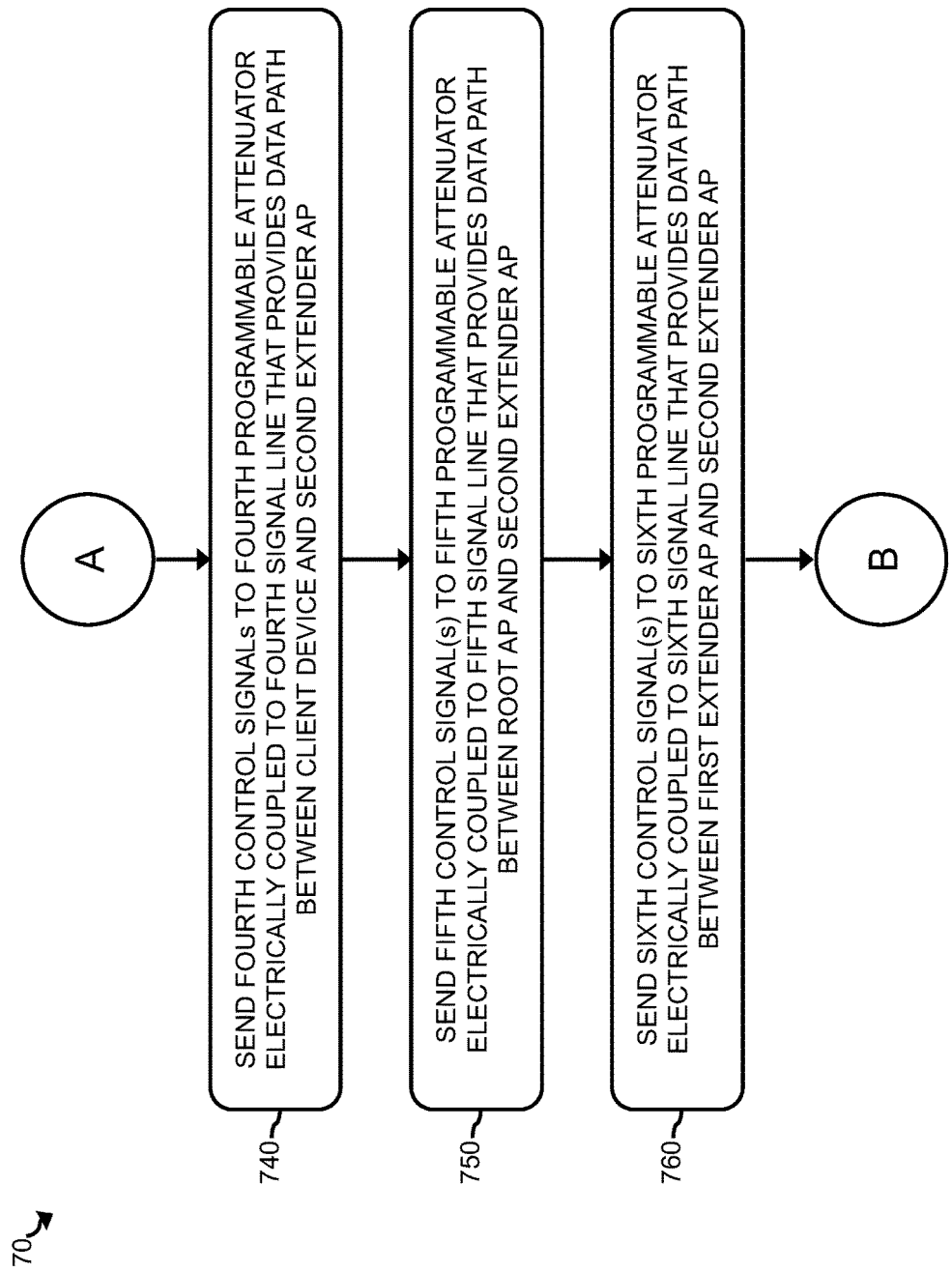

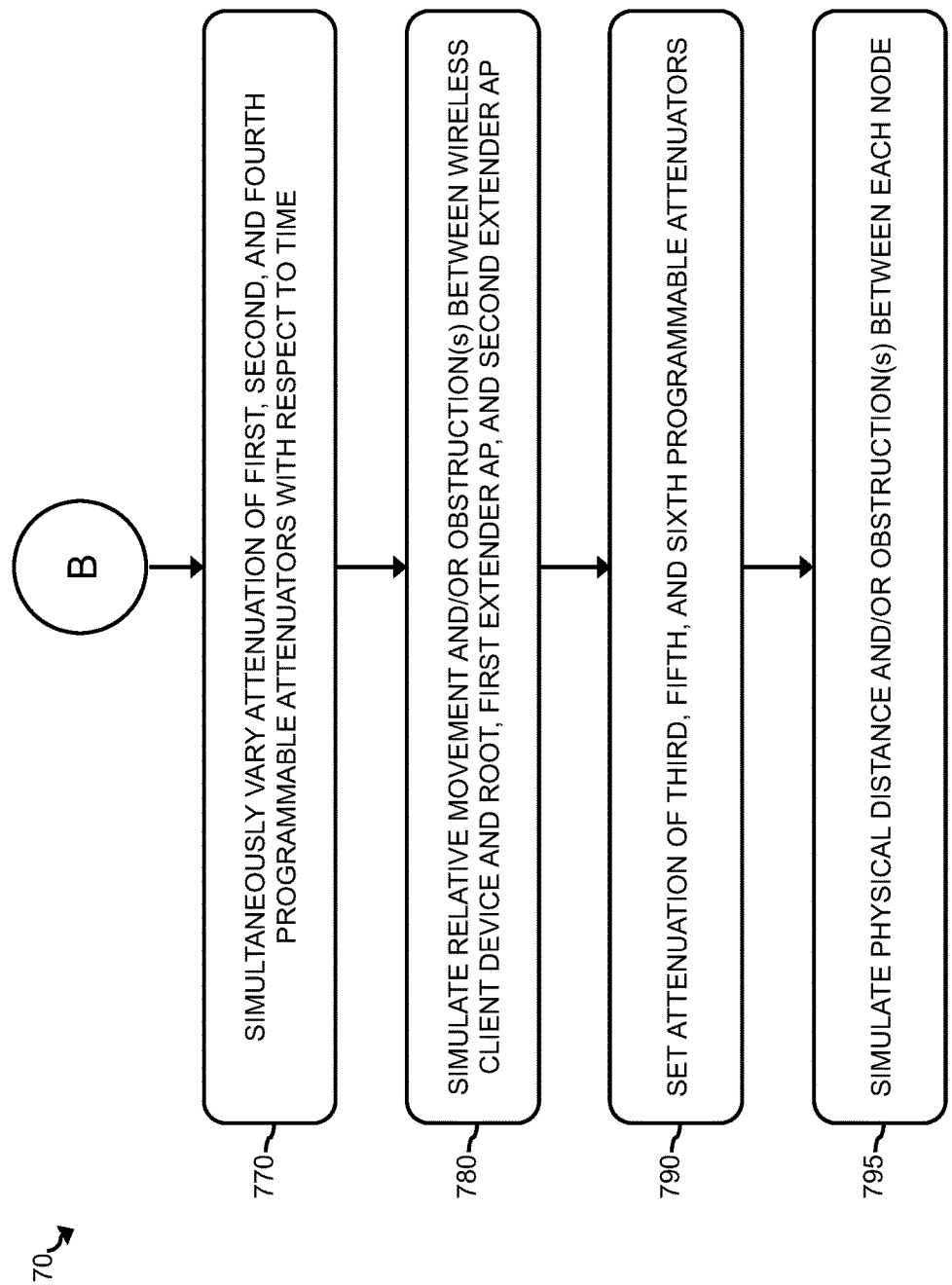

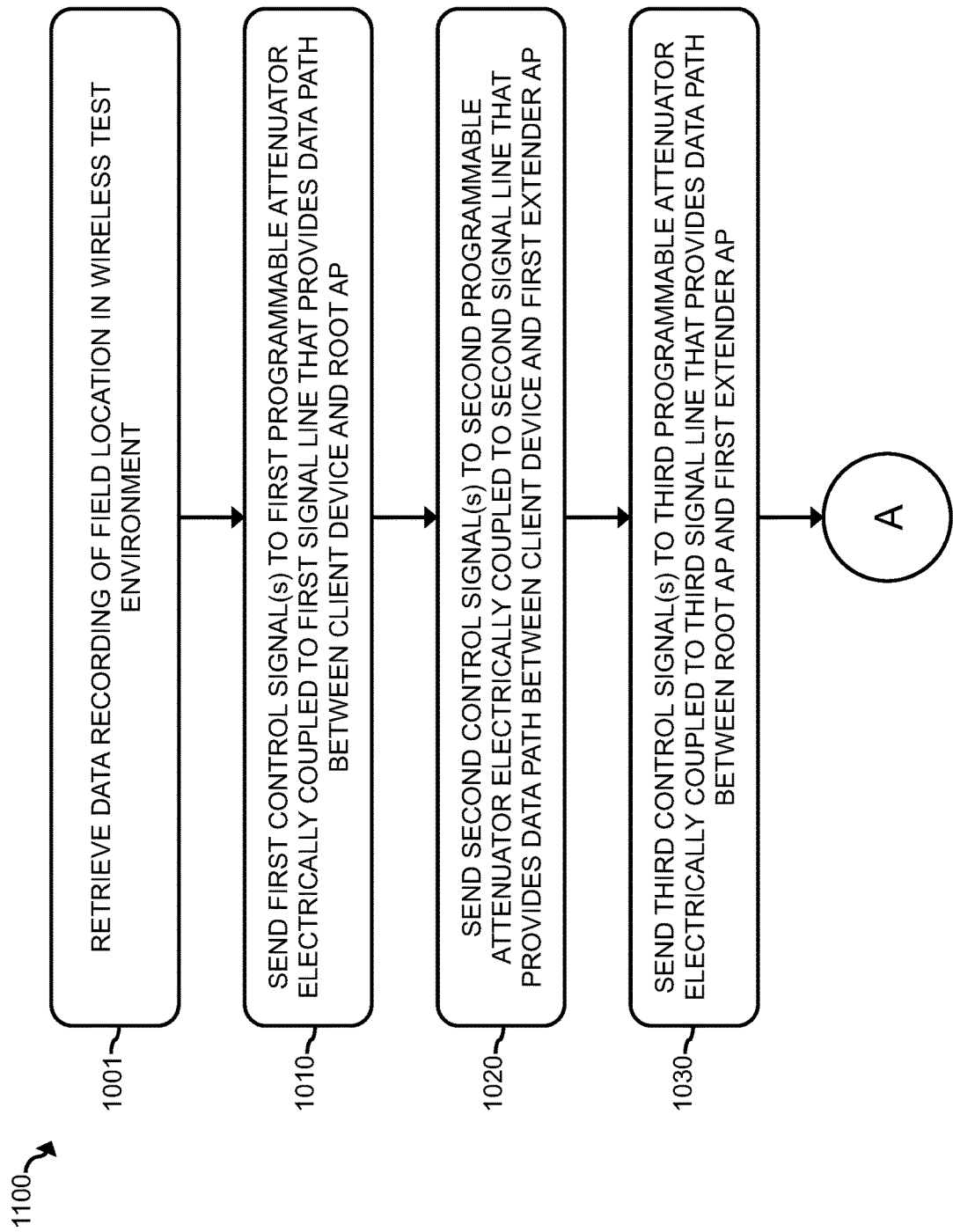

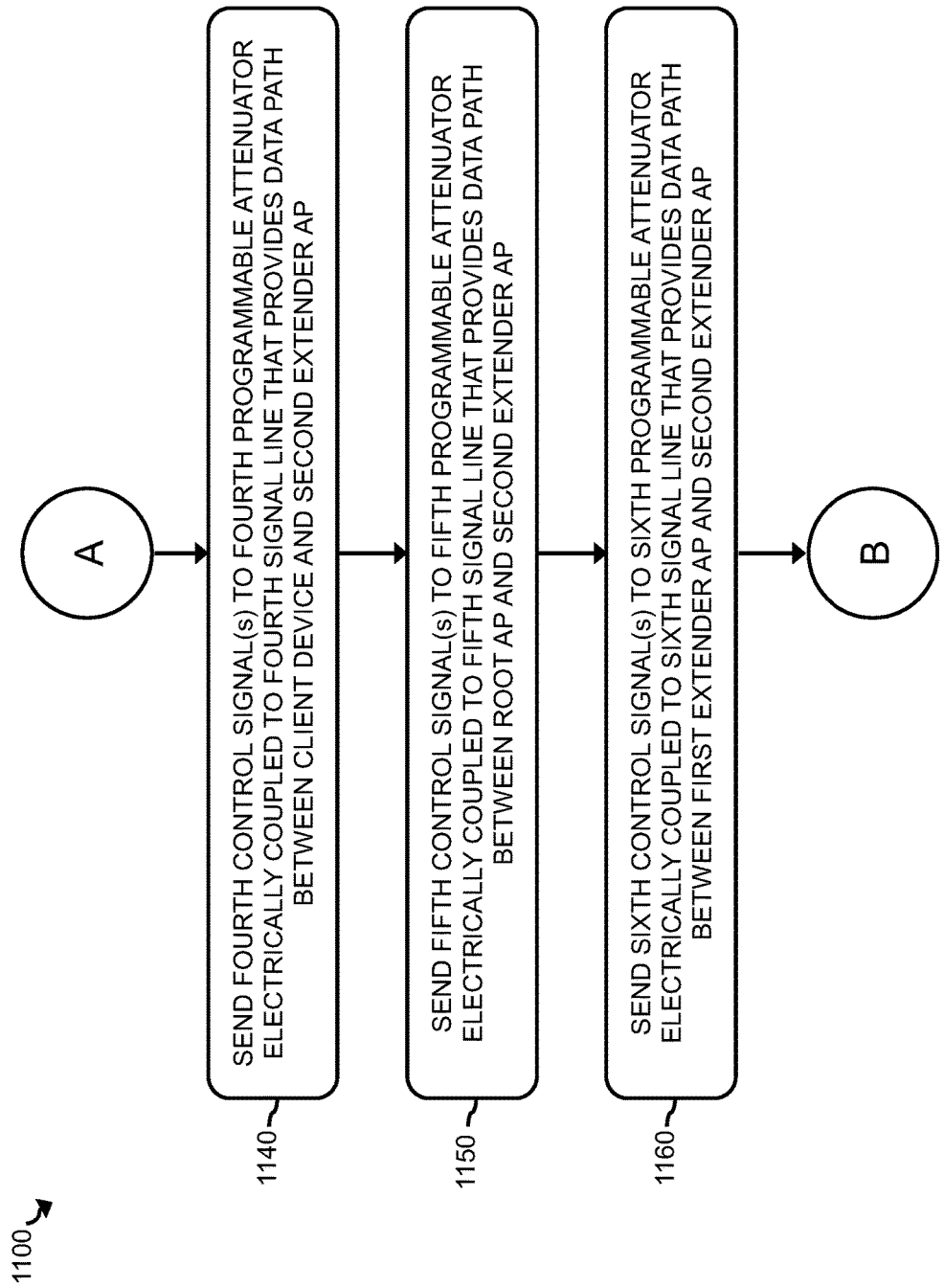

METHOD AND SYSTEM FOR WI-FI FIELD-TO-LAB TESTING

CROSS-REFERENCE TO RELATED APPLICATIONS

This application claims priority to U.S. Provisional Application No. 63/106,940, titled "A Method and System for Field to Lab Capture," filed on Oct. 29, 2020, which is hereby incorporated by reference.

TECHNICAL FIELD

This application relates generally to wireless and Wi-Fi field-to-lab testing.

BACKGROUND

Common problems in the wireless testing industry today pertains to the difficulty, time-consuming, costly, and reliability issues of testing real world scenarios in the real world. To remedy these issues, it is preferable to replicate real world phenomena in a lab setting, called field to lab replication.

Specifically, a significant problem is the difficulty to capture real world scenarios and be able to easily replicate them in a controlled environment. This problem is especially acute in more complicated service scenarios where multiple devices or possible device scenarios are involved.

For example, Wi-Fi mesh networks are difficult to replicate in a controlled environment because of the multitude of different kinds of homes and variety of methods for building Wi-Fi mesh systems into the homes. In particular, one could have a single router only, have one router and a mesh node, or more than one mesh node.

In particular, the root router connected to the internet could be anywhere in a home, and the first and second extenders could be placed in many different rooms within the home. Furthermore, there are hundreds if not thousands of different methods and locations for utilizing Wi-Fi devices in these homes including use of an iPad in the living room, use of an Android mobile phone while walking around the home or in the garage or driveway.

A particular subset of the problem is capturing the propagation experienced in a specific environment of interest such as a house, office, industrial building, open area, or mine. For example, houses are of different size, different room configurations, and are built with various construction materials and methodologies. Further, different types of furniture and moveable items are placed in a home which can cause a great variability in signal propagation in a home. Multiple different kinds of mesh networks can be built into these houses, therefore resulting in multiple propagation scenarios.

As a result, testing the foregoing scenarios in the field is time and cost prohibitive. Replicating these scenarios in a lab is time consuming and questions often remain whether a scenario has been reliability replicated. The limited selection of testing methodologies and lack of confidence in the available industry methodologies has resulted in a situation where many of the more complicated scenarios are simply not tested. The outcome is the ineffectiveness of routers and wireless services and subsequent unhappy consumers.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a method for field-to-lab testing of a wireless device, comprising retrieving, with a computer operatively coupled to a non-transitory computer readable storage medium, (a) data representing a recording of a wireless field client device in a wireless field test environment and (b) data representing a physical configuration of the wireless field test environment. The wireless field test environment includes a mesh network comprising: a field wireless-root access point (AP); and a field wireless-extender AP in wireless communication with the field wireless-root AP, wherein: the data representing the recording includes wireless path-loss measurements between the field wireless-root AP and the wireless field client device and between the field wireless-extender AP and the wireless field client device, and the data representing the physical configuration of the wireless field test environment includes wireless path-loss measurements from the field wireless-root AP to the field wireless-extender AP and from the field wireless-extender AP to the field wireless-root AP. The method further comprises: sending one or more first control signals from the computer to a first programmable attenuator that is electrically coupled to a first signal line that provides a first data communication path between (a) a wireless laboratory client device located in a client electromagnetically-isolated chamber and (b) a laboratory wireless-root AP located in a root electromagnetically-isolated chamber, whereby the wireless laboratory client device and the laboratory wireless-root AP are in electrical communication to transmit root-client signals to each other; sending one or more second control signals from the computer to a second programmable attenuator that is electrically coupled to a second signal line that provides a second data communication path between (a) the wireless laboratory client device and (b) a laboratory wireless-extender AP located in an extender electromagnetically-isolated chamber, whereby the wireless laboratory client device and the laboratory wireless-extender AP are in electrical communication to transmit extender-client signals to each other; sending one or more third control signals from the computer to a third programmable attenuator that is electrically coupled to a third signal line that provides a third data communication path between (a) the laboratory wireless-root AP and (b) the laboratory wireless-extender AP, whereby the laboratory wireless-root AP and the laboratory wireless-extender AP are in electrical communication to transmit root-extender signals to each other; setting a first attenuation produced by the first programmable attenuator according to the first control signal(s); setting a second attenuation produced by the second programmable attenuator according to the second control signal(s); and setting a third attenuation produced by the third programmable attenuator according to the third control signal(s). The first and second attenuations simulates a field location of the wireless laboratory client device in the wireless field test environment. The third attenuation simulates the physical configuration of the wireless field test environment.

In one or more embodiments, the method further comprises setting (a) a signal strength of the root-extender signals and (b) a signal strength of the extender-client signals, wherein: the signal strength of the root-extender signals reproduces, from a perspective of the wireless laboratory client device, an effective distance between the wireless field client device and the field wireless-root AP at the field location of the wireless laboratory client device in the wireless field test environment, and the signal strength of the extender-client signals reproduces, from the perspective of the wireless laboratory client device, an effective distance between the wireless field client device and the field wireless-extender AP at the field location of the wireless laboratory client device in the wireless field test environment. In one or more embodiments, the method further comprises setting a signal strength of the root-extender signals, wherein the signal strength of the root-extender signals reproduces, from a perspective of the laboratory wireless-root AP, an effective distance between the field wireless-root AP and the field wireless-extender AP in the wireless field test environment.

In one or more embodiments, the root-client signals are root-client laboratory signals, the extender-client signals are extender-client laboratory signals, and the method further comprises: placing the wireless field client device at the field location in the wireless field test environment; while the wireless field client device is at the field location, repeatedly measuring with the wireless field client device: (a) a signal strength of root-client field wireless signals sent between the field wireless-root AP and the wireless field client device and (b) a signal strength of extender-client field wireless signals sent between the field wireless-extender AP and the wireless field client device; and storing signal strength measurements of the root-client field wireless signals and of the extender-client field wireless signals in non-transitory memory operatively coupled to the wireless field client device.

In one or more embodiments, the data representing the recording includes wireless path-loss measurements, as the wireless field client device is moved along a path in the wireless field test environment, between the field wireless-root AP and the wireless field client device and between the field wireless-extender AP and the wireless field client device, and the method further comprises: simultaneously varying (a) the first attenuation with respect to time produced by the first programmable attenuator according to the first control signals and (b) the second attenuation with respect to time produced by the second programmable attenuator according to the second control signals, wherein a simultaneous variation of the first and second attenuations with respect to time simulates a movement of the wireless laboratory client device along the path through the wireless field test environment. In one or more embodiments, the method further comprises simultaneously varying (a) a signal strength, with respect to time, of the root-client signals and (b) a signal strength, with respect to time, of the extender-client signals, wherein a simultaneous variation of the signal strength of the root-client signals and of the signal strength of the extender-client signals reproduces, from the perspective of the wireless laboratory client device, the movement of the wireless field client device along the path through the wireless field test environment.

In one or more embodiments, the root-client signals are root-client laboratory signals, the extender-client signals are extender-client laboratory signals, and the method further comprises: moving the wireless field client device along the path through the wireless field test environment; while moving the wireless field client device along the path, repeatedly measuring with the wireless field client device: (a) a signal strength of root-client field wireless signals sent between the field wireless-root AP and the wireless field client device and (b) a signal strength of extender-client field wireless signals sent between the field wireless-extender AP and the wireless field client device; and storing signal strength measurements of the root-client field wireless signals and of the extender-client field wireless signals in non-transitory memory operatively coupled to the wireless field client device. In one or more embodiments, the method further comprises: moving the wireless field client device to within a predetermined radius of the field wireless-root AP; while the wireless field client device is within the predetermined radius of the field wireless-root AP, measuring a signal strength of extender field wireless signals sent from the field wireless-extender AP to the field wireless-root AP; moving the wireless field client device to within a predetermined radius of the field wireless-extender AP; while the wireless field client device is within the predetermined radius of the field wireless-extender AP, measuring a signal strength of root field wireless signals sent from the field wireless-root AP to the field wireless-extender AP; and storing signal strength measurements of the root field wireless signals and of the extender field wireless signals in the non-transitory memory operatively coupled to the wireless field client device. In one or more embodiments, the path passes through the predetermined radius of the field wireless-root AP and the predetermined radius of the field wireless-extender AP.

In one or more embodiments, the field wireless-extender AP is a first field wireless-extender AP, the laboratory wireless-extender AP is a first laboratory wireless-extender AP, the extender-client signals are first-extender-client signals, the root-extender signals are root-first-extender signals, the extender electromagnetically-isolated chamber is a first extender electromagnetically-isolated chamber, the wireless field test environment includes a second field wireless-extender AP in wireless communication with the field wireless-root AP and the first wireless-extender AP, the data representing the recording further includes wireless path-loss measurements, as the wireless field client device is moved along the path, between the second field wireless-root AP and wireless field client device, between the second field wireless-extender AP and the wireless field client device, and between the first and second field wireless-root APs, the data representing the configuration of the wireless field test environment further includes wireless path-loss measurements from the field wireless-root AP to the second field wireless-extender AP, from the second field wireless-extender AP to the field wireless-root AP, from the first field wireless-extender AP to the second field wireless-extender AP, and second field wireless-extender AP to the first field wireless-extender AP, and the method further comprises: sending fourth control signals from the computer to a fourth programmable attenuator that is electrically coupled to a fourth signal line, the fourth signal line electrically coupling (a) the wireless laboratory client device and (b) a second laboratory wireless-extender AP located in a second extender electromagnetically-isolated chamber, whereby the wireless laboratory client device and the second laboratory wireless-extender AP are in electrical communication to transmit second-extender-client signals to each other; sending one or more fifth control signals from the computer to a fifth programmable attenuator that is electrically coupled to a fifth signal line, the fifth signal line electrically coupling (a) the laboratory wireless-root AP and (b) the second laboratory wireless-extender AP, whereby the laboratory wireless-root AP and the second laboratory wireless-extender AP are in electrical communication to transmit second-extender-root signals to each other; sending one or more sixth control signals from the computer to a sixth programmable attenuator that is electrically coupled to a sixth signal line, the sixth signal line electrically coupling (a) the first laboratory wireless-extender AP (b) the second laboratory wireless-extender AP, whereby the first laboratory wireless-extender AP and the second laboratory wireless-extender AP are in electrical communication to transmit first-extender-second-extender signals to each other; simultaneously varying (a) the first attenuation with respect to time, (b) the second attenuation with respect to time, and (c) a fourth attenuation with respect to time produced by the fourth programmable attenuator according to the fourth control signals; setting a fifth attenuation produced by the fifth programmable attenuator according to the fifth control signal(s); and setting a sixth attenuation produced by the sixth programmable attenuator according to the sixth control signal(s), wherein: the simultaneous variation of the first, second, and fourth attenuations with respect to time simulates the movement of the wireless laboratory client device along the path through the wireless field test environment, and the third, fifth, and sixth attenuations simulate the physical configuration of the wireless field test environment.

Another aspect of the invention is directed to a system for field-to-lab testing of a wireless device, comprising: a wireless laboratory client device located in a client electromagnetically-isolated chamber; a laboratory wireless-root access point (AP) located in a root electromagnetically-isolated chamber; a laboratory wireless-extender AP located in an extender electromagnetically-isolated chamber; a first signal line that provides a first data communication path between (a) the wireless laboratory client device and (b) the laboratory wireless-root AP; a first programmable attenuator electrically coupled to the first signal line; a second signal line that provides a second data communication path between (a) the wireless laboratory client device and (b) the laboratory wireless-extender AP; a second programmable attenuator electrically coupled to the second signal line; a third signal line that provides a third data communication path between (a) the laboratory wireless-root AP and (b) the laboratory wireless-extender AP; a third programmable attenuator electrically coupled to the third signal line; a computer in electrical communication with first, second, and third programmable attenuators, the computer operatively coupled to a non-transitory computer readable storage medium that includes (a) data representing a recording of a wireless field client device in a wireless field test environment and (b) data representing a physical configuration of the wireless field test environment, the wireless field test environment including: a field wireless-root AP; and a field wireless-extender AP in wireless communication with the field wireless-root AP. The data representing the recording includes wireless path-loss measurements between the field wireless-root AP and the wireless field client device and between the field wireless-extender AP and the wireless field client device. The data representing the physical configuration of the wireless field test environment includes wireless path-loss measurements between the field wireless-root AP and the field wireless-extender AP and between the field wireless-extender AP and the field wireless-root AP. The computer is configured to: send one or more first control signals to the first programmable attenuator to set a first attenuation produced by the first programmable attenuator, send one or more second control signals to the second programmable attenuator to set a second attenuation produced by the second programmable attenuator, and send one or more third control signals to the third programmable attenuator, wherein: the first and second attenuations simulates a field location of the wireless laboratory client device in the wireless field test environment, and the third attenuation simulates the physical configuration of the wireless field test environment.

In one or more embodiments, the first attenuation sets a signal strength of the root-extender signals, the second attenuation sets a signal strength of the extender-client signals, the third attenuation sets a signal strength of the root-extender signals, the signal strength of the root-extender signals reproduces, from a perspective of the wireless laboratory client device, an effective distance between the wireless field client device and the field wireless-root AP at the field location of the wireless laboratory client device in the wireless field test environment, the signal strength of the extender-client signals reproduces, from the perspective of the wireless laboratory client device, an effective distance between the wireless field client device and the field wireless-extender AP at the field location of the wireless laboratory client device in the wireless field test environment, and the signal strength of the root-extender signals reproduces, from a perspective of the laboratory wireless-root AP, an effective distance between the field wireless-root AP and the field wireless-extender AP in the wireless field test environment.

In one or more embodiments, the wireless field client device comprises a wireless link monitor. In one or more embodiments, the data representing the recording includes wireless path-loss measurements, as the wireless field client device is moved along a path in the wireless field test environment, between the field wireless-root AP and the wireless field client device and between the field wireless-extender AP and the wireless field client device, the first and second control signals cause the first and second programmable attenuators to simultaneously vary the first and second attenuations with respect to time, and a simultaneous variation of the first and second attenuations, with respect to time, simulates a movement of the wireless laboratory client device along the path through the wireless field test environment.

In one or more embodiments, the simultaneous variation of the first and second attenuations, with respect to time, causes a simultaneous variation of (a) a signal strength, with respect to time, of the root-client signals and (b) a signal strength, with respect to time, of the extender-client signals, and the simultaneous variation of (a) a signal strength, with respect to time, of the root-client signals and (b) a signal strength, with respect to time, of the extender-client signals reproduces, from the perspective of the wireless laboratory client device, a movement of the wireless field client device along the path through the wireless field test environment.

In one or more embodiments, the field wireless-extender AP is a first field wireless-extender AP, the laboratory wireless-extender AP is a first laboratory wireless-extender AP, the extender-client signals are first-extender-client signals, the root-extender signals are root-first-extender signals, the extender electromagnetically-isolated chamber is a first extender electromagnetically-isolated chamber, the wireless field test environment includes a second field wireless-extender AP in wireless communication with the field wireless-root AP and the first wireless-extender AP, the data representing the recording further includes wireless path-loss measurements, as the wireless field client device is moved along the path, between the second field wireless-root AP and the wireless field client device, between the first field wireless-extender AP and the wireless field client device, and between the field wireless-root AP and the wireless field client device, the data representing the configuration of the wireless field test environment further includes wireless path-loss measurements between the field wireless-root AP and the first field wireless-extender AP, between the field wireless-root AP and the second field wireless-extender AP, and between the first field wireless-extender AP and the second field wireless-extender AP, and the system further comprises: a second laboratory wireless-extender AP located in a second extender electromagnetically-isolated chamber, a fourth signal line that provides a data communication path between (a) the wireless laboratory client device and (b) the second laboratory wireless-extender AP, whereby the wireless laboratory client device and the second laboratory wireless-extender AP are in electrical communication to transmit second-extender-client signals to each other; a fourth programmable attenuator electrically coupled to the fourth signal line; a fifth signal line that provides a data communication path between (a) the laboratory wireless-root AP and (b) the second laboratory wireless-extender AP, whereby the laboratory wireless-root AP and the second laboratory wireless-extender AP are in electrical communication to transmit second-extender-root signals to each other; a fifth programmable attenuator electrically coupled to the fifth signal line, the fifth programmable attenuator producing a fifth attenuation; a sixth signal line that provides a data communication path between (a) the first laboratory wireless-extender AP and (b) the second laboratory wireless-extender AP, whereby the first laboratory wireless-extender AP and the second laboratory wireless-extender AP are in electrical communication to transmit first-extender-second-extender signals to each other. The computer is further configured to: send fourth control signals to the fourth programmable attenuator to vary a fourth programmable attenuation, with respect to time, produced by the fourth programmable attenuator; send one or more fifth control signals to the fifth programmable attenuator to set a fifth attenuation produced by the fifth programmable attenuator, and send one or more sixth control signals to the sixth programmable attenuator to set a sixth attenuation produced by the sixth programmable attenuator, wherein: the first, second, and fourth control signals cause the first, second, and fourth attenuations, respectively, to vary simultaneously, with respect to time, to simulate the movement of the wireless laboratory client device along the path through the wireless field test environment, and the third, fifth, and sixth attenuations simulate the physical configuration of the wireless field test environment.

In one or more embodiments, the system further comprises a first client antenna disposed in the client electromagnetically-isolated chamber, the first client antenna electrically coupled to the first signal line; a first root antenna disposed in the root electromagnetically-isolated chamber, the first root antenna electrically coupled to the first signal line; a second client antenna disposed in the client electromagnetically-isolated chamber, the second client antenna electrically coupled to the second signal line; a first extender antenna disposed in the extender electromagnetically-isolated chamber, the first extender antenna electrically coupled to the second signal line; a second root antenna disposed in the root electromagnetically-isolated chamber, the second root antenna electrically coupled to the third signal line; and a second extender antenna disposed in the extender electromagnetically-isolated chamber, the second extender antenna electrically coupled to the third signal line, whereby the wireless laboratory client device, the laboratory wireless-root AP, and the laboratory wireless-extender AP are in wireless communication with each other.

In one or more embodiments, the first signal line is electrically connected to a first port in the wireless laboratory client device and a first port in the laboratory wireless-root AP, the second signal line is electrically connected to a second port in the wireless laboratory client device and a first port in the laboratory wireless-extender AP, and the third signal line is electrically connected to a second port in the laboratory wireless-root AP and a second port in the laboratory wireless-extender AP, whereby the wireless laboratory client device, the laboratory wireless-root AP, and the laboratory wireless-extender AP are in wired communication with each other.

Yet another aspect of the invention is directed to a computer program product comprising computer-readable instructions that, when executed by a processor, cause the processor to: retrieve, with a computer operatively coupled to a non-transitory computer readable storage medium, (a) data representing a recording of a wireless field client device in a wireless field test environment and (b) data representing a physical configuration of the wireless field test environment, the wireless field test environment including a mesh network comprising: a field wireless-root access point (AP); and a field wireless-extender AP in wireless communication with the field wireless-root AP, wherein: the data representing the recording includes wireless path-loss measurements between the field wireless-root AP and the wireless field client device and between the field wireless-extender AP and the wireless field client device, and the data representing the physical configuration of the wireless field test environment includes wireless path-loss measurements from the field wireless-root AP to the field wireless-extender AP and from the field wireless-extender AP to the field wireless-root AP. The instructions further cause the processor to: send one or more first control signals from the computer to a first programmable attenuator that is electrically coupled to a first signal line that provides a first data communication path between (a) a wireless laboratory client device located in a client electromagnetically-isolated chamber and (b) a laboratory wireless-root AP located in a root electromagnetically-isolated chamber, whereby the wireless laboratory client device and the laboratory wireless-root AP are in electrical communication to transmit root-client signals to each other; send one or more second control signals from the computer to a second programmable attenuator that is electrically coupled to a second signal line that provides a second data communication path between (a) the wireless laboratory client device and (b) a laboratory wireless-extender AP located in an extender electromagnetically-isolated chamber, whereby the wireless laboratory client device and the laboratory wireless-extender AP are in electrical communication to transmit extender-client signals to each other; send one or more third control signals from the computer to a third programmable attenuator that is electrically coupled to a third signal line that provides a third data communication path between (a) the laboratory wireless-root AP and (b) the laboratory wireless-extender AP, whereby the laboratory wireless-root AP and the laboratory wireless-extender AP are in electrical communication to transmit root-extender signals to each other; set a first attenuation produced by the first programmable attenuator according to the first control signal(s); set a second attenuation produced by the second programmable attenuator according to the second control signal(s); and set a third attenuation produced by the third programmable attenuator according to the third control signal(s), wherein: the first and second attenuations simulates a field location of the wireless laboratory client device in the wireless field test environment, and the third attenuation simulates the physical configuration of the wireless field test environment.

In one or more embodiments, the data representing the recording includes wireless path-loss measurements, as the wireless field client device is moved along a path in the wireless field test environment, between the field wireless-root AP and the wireless field client device and between the field wireless-extender AP and the wireless field client device, and the instructions further cause the processor to: simultaneously vary (a) the first attenuation with respect to time produced by the first programmable attenuator according to the first control signals and (b) the second attenuation with respect to time produced by the second programmable attenuator according to the second control signals, wherein a simultaneous variation of the first and second attenuations with respect to time simulates a movement of the wireless laboratory client device along the path through the wireless field test environment.

BRIEF DESCRIPTION OF THE DRAWINGS

For a fuller understanding of the nature and advantages of the concepts disclosed herein, reference is made to the detailed description of preferred embodiments and the accompanying drawings.

FIG. 7 is a flow chart of a method for field-to-lab testing a wireless device according to another embodiment.

DETAILED DESCRIPTION

A client device (e.g., a wireless link monitor) is moved along a path in a field test environment containing mesh network nodes that produce a Wi-Fi mesh network. The client device measures the signal strength of the Wi-Fi signals sent from each mesh network node as the client device is moved along the path. The signal strength of the Wi-Fi signals sent from each mesh network node is converted into path-loss measurements based on the effective radiated power (e.g., ERP or EIRP) of each mesh network field node and the gain of the client device's antenna. These path-loss measurements are used to vary the attenuation of programmable attenuators in a field-to-lab test environment to simulate and/or reproduce the "experience" of the client device moving along the path.

Figure 1A:
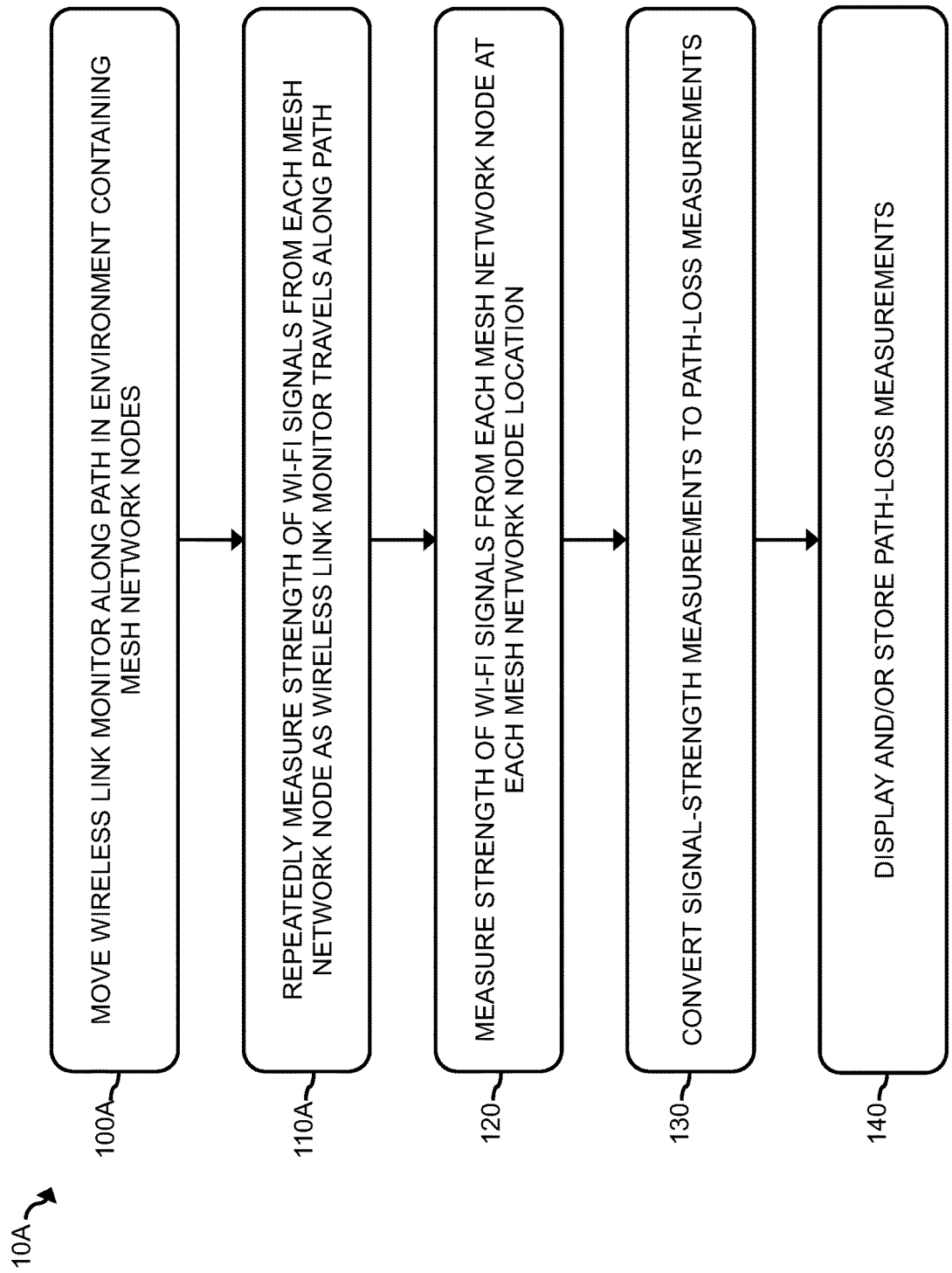
FIGS. 1A and 1B are flow charts of a method for recording wireless field client device in a field test environment according to alternative embodiments.
Figure 1B:
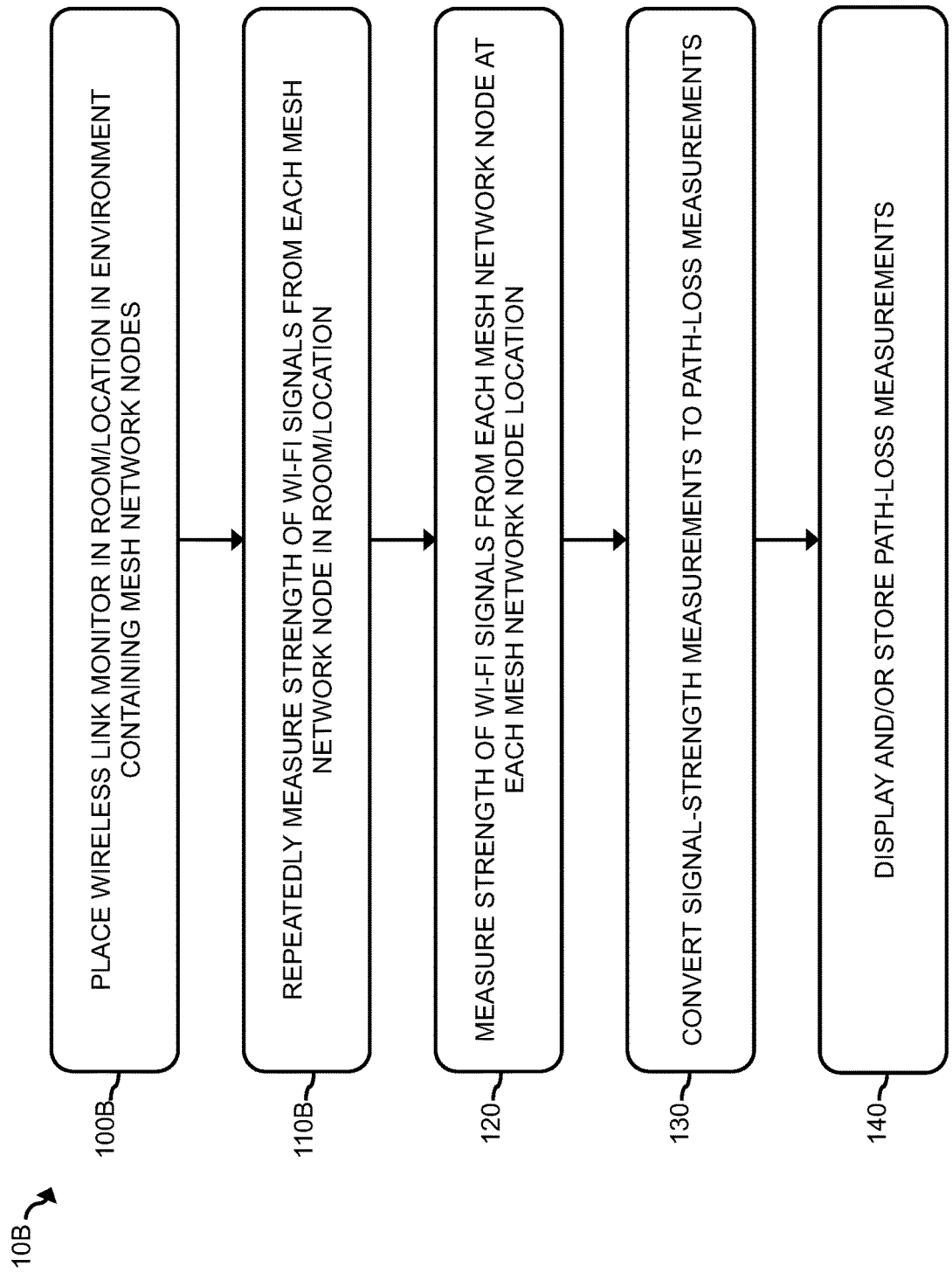

FIGS. 1A and 1B are flow charts of method 10A, 10B for recording wireless field client device in a field test environment according to alternative embodiments. In step 100A of method 10A, a wireless link monitor (e.g., a sniffer) is moved along a path in a field test environment containing mesh network nodes that produce a Wi-Fi mesh network. In step 100B of method 10B, the wireless link monitor (e.g., a sniffer) is moved to a location or room in the field test environment.

Figure 2:
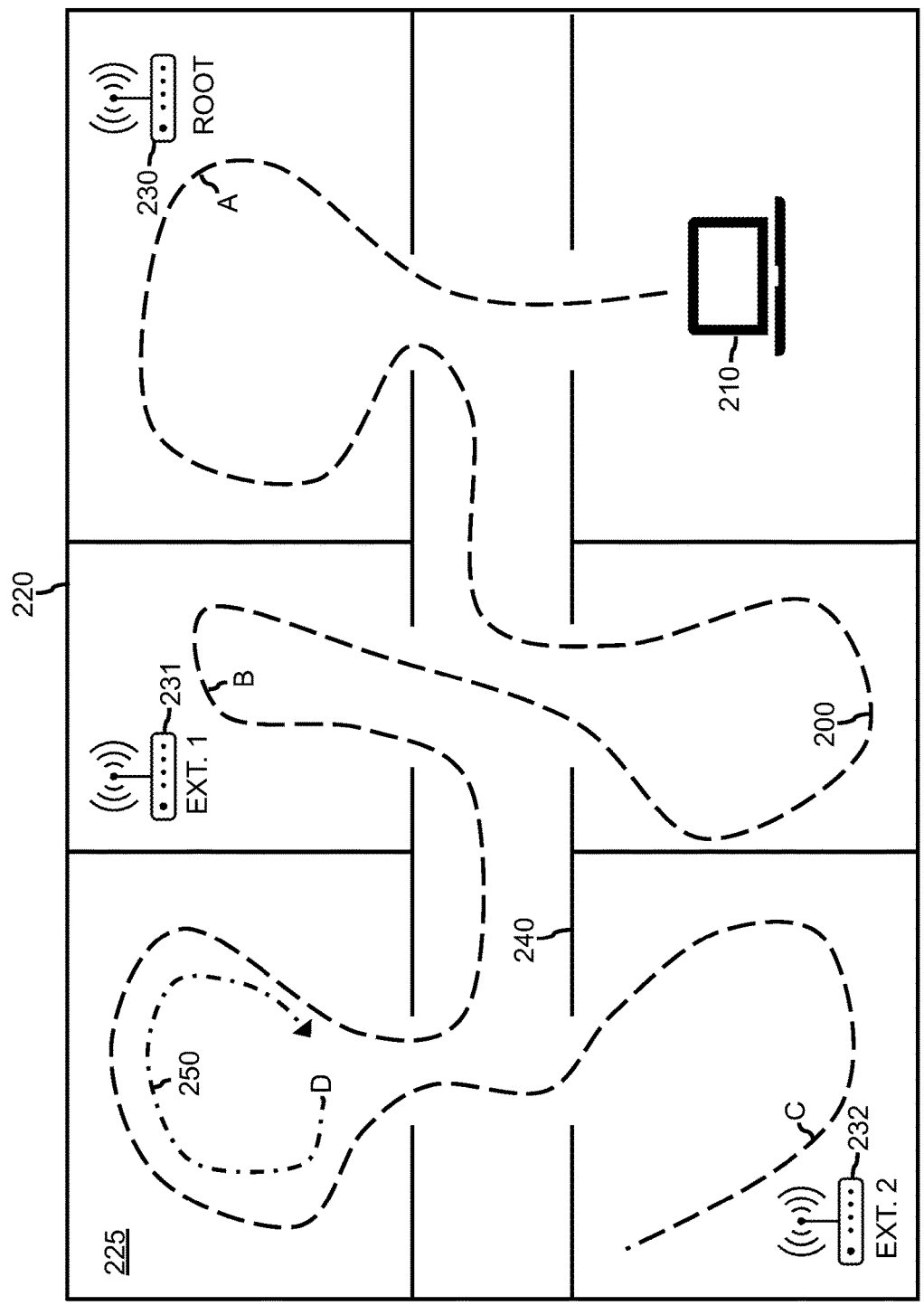
FIG. 2 illustrates an example path taken by a wireless link monitor through an example field-test environment.

FIG. 2 illustrates an example path 200 taken by a wireless link monitor 210 through an example field-test environment 220, which can be a house, a building, or another location. The path 200 can be straight or circuitous and preferably passes within a predetermined radius of (e.g., within 3 feet of) each mesh network node AP 230-232. The wireless link monitor 210 can be held by a person (or another animal) that travels (e.g., walks or runs) along the path 200, transported by a robot along the path 200, or otherwise moved along the path 200. The wireless link monitor 210 functions as a client device in the Wi-Fi mesh network and has the ability to collect data regarding the wireless signals sent from each mesh network node AP 230-232. The Wi-Fi mesh network can include additional or fewer mesh network node APs 230-232 in other embodiments.

In another embodiment, the path 200 can be short and can only include pass through one or two rooms 225, a portion of a room 225, or one or two discrete locations in a room 225.

Thus, in step 100A, the wireless link monitor 210 can be moved along some or all of the path 200. In step 100B, the wireless link monitor 210 can be placed or held at a single location in a room 225, moved within the room 225, or placed in another location in the field-test environment 220. For example, in step 100B the wireless link monitor 210 can be placed or held at location D for all of step 100B. In another example, the wireless link monitor 210 can start at location D and move along a path within room 225, such as example path 250.

In step 110A, the wireless link monitor 210 is used to repeatedly (e.g., continuously such as multiple times per second) measure the strength or power (e.g., the received signal strength indicator (RSSI)) of the Wi-Fi signals received from each mesh network node AP 230-232 as the wireless link monitor 210 travels along the path 200. In step 110B, the wireless link monitor 210 is used to repeatedly (e.g., continuously such as multiple times per second) measure the strength or power (e.g., the received signal strength indicator (RSSI)) of the Wi-Fi signals received from each mesh network node AP 230-232 as the wireless link monitor 210 is located in a given room 225 (e.g., at location D), moved within a room 225 (e.g., along example path 250), or placed or held in another location in the field-test environment 220.

During steps 110A, 110B, the wireless link monitor 210 can also measure other wireless parameters, such as data throughput, data rate, packet loss, as the wireless link monitor 210 travels along the path 200. In some embodiments, the RSSI is a function of frequency, in which case the wireless link monitor 210 can simultaneously capture the RSSI for multiple frequencies. Additionally or alternatively, steps 100 and 110 can be repeated to capture RSSI data at different frequencies. For example, in order to capture the RSSI to determine the propagation loss accurately for all frequencies of interest, steps 100 and 110 would have to be replicated n times where n is the number of frequencies of interest.

Figure 3:
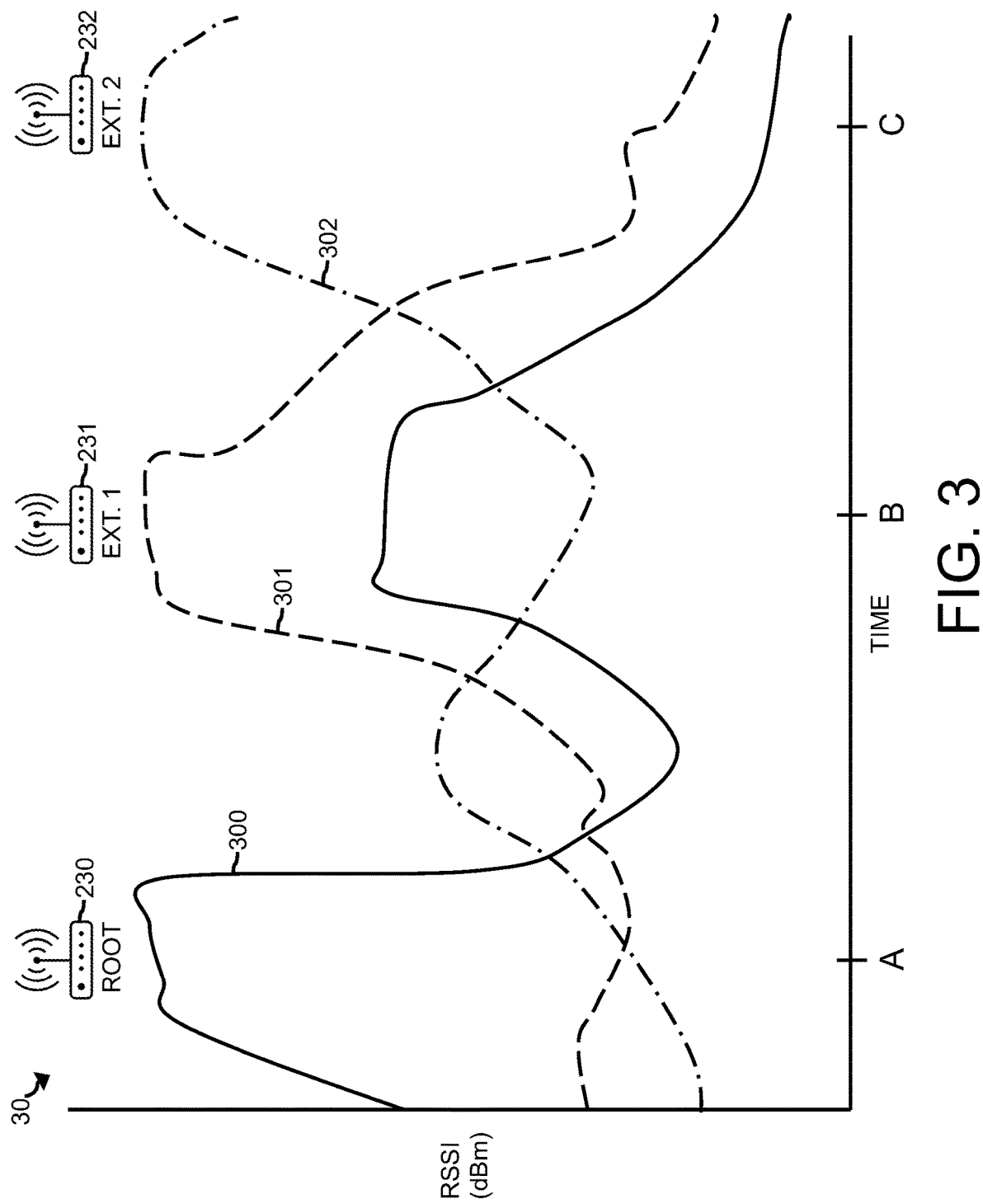
FIG. 3 is a graph that includes example signal strength data of Wi-Fi signals from the mesh network nodes in the field test environment illustrated in FIG. 2 as the wireless link monitor is moved along the example path.

FIG. 3 is a graph 30 that includes example RSSI data of the Wi-Fi signals from mesh network nodes AP 230-232 as the wireless link monitor 210 is moved along path 200 at a constant or substantially constant rate. The RSSI data is plotted versus time (e.g., seconds) for the root Wi-Fi signal 300, for the first extender Wi-Fi signal 301, and for the second extender Wi-Fi signal 302.

As can be seen, the RSSI of the root Wi-Fi signal 300 is highest in the beginning, which corresponds to the initial portion of path 200 when the wireless link monitor 210 is relatively close to the root AP node 230. The RSSI of the first extender Wi-Fi signal 301 is highest about halfway through the timed measurements, which corresponds to the middle portion of path 200 when the wireless link monitor 210 is relatively close to the first extender AP node 231. The RSSI of the second extender Wi-Fi signal 302 is highest at the end of the timed measurements, which corresponds to the end of path 200 when the wireless link monitor 210 is relatively close to the second extender AP node 232. The RSSI of each Wi-Fi signal 300-302 varies over time based on the relative physical distance (e.g., straight-line distance) between the wireless link monitor 210 and each mesh network node AP 230-232 and based on any obstructions between the wireless link monitor 210 and each mesh network node AP 230-232, such as walls 240, furniture, etc. The materials of the walls 240 and behind the walls 240 (e.g., insulation, pipes, wiring, etc.) may not be uniform, which can further impact the RSSI of each Wi-Fi signal 300-302.

In step 120, the wireless link monitor 210 is used to measure the strength or power (e.g., RSSI) of the Wi-Fi signals sent from each mesh network node AP 230-32 when the wireless link monitor is located within a predetermined radius of (e.g., within 3 feet of) each mesh network node AP. The strength of the Wi-Fi signals from each mesh network node AP at or approximately at the location each mesh network node AP (e.g., inter-AP RSSI measurements or readings) provides information on the configuration of the mesh network APs. For example, the inter-AP RSSI measurements correspond to the effective distance (e.g., effective radio-frequency (RF) distance) between each mesh network AP, which can be a combination of physical distance and one or more obstructions between each mesh network AP. Step 120 can be performed during or separately (e.g., at another time) from step 110A. In FIG. 2, the path 200 passes next to (e.g., within 3 feet of) each mesh network node AP 230-232 which allows the wireless link monitor 210 to perform step 120 during step 110. For example, the RSSI data collected in step 120 can be collected when the wireless link monitor 210 is located at path locations A, B, and C in path 200, which corresponds to times A, B, and C, respectively, in FIG. 3. Step 120 is performed separately (e.g., at another time) from step 110B.

In step 130, the signal strength measurements collected in step 110A or 110B and step 120 are converted (e.g., using a computer) to wireless (e.g., RF) path-loss measurements using the effective radiated power (ERP) or the effective isotropic radiated power (EIRP) of each mesh network AP and the antenna gain of the wireless link monitor used to collect the strength of the Wi-Fi signals in steps 110A, 110B and 120. The ERP/EIRP and the antenna gain of the wireless link monitor are generally known values of the devices.

In step 140, the path-loss measurements are displayed on a display screen that is operatively coupled to the computer used in step 130. Additionally or alternatively, the path-loss measurements are stored in computer memory such and/or in a non-transitory computer-readable medium, which in either case can represent a "recording" of the real-world field test.

Figure 4:
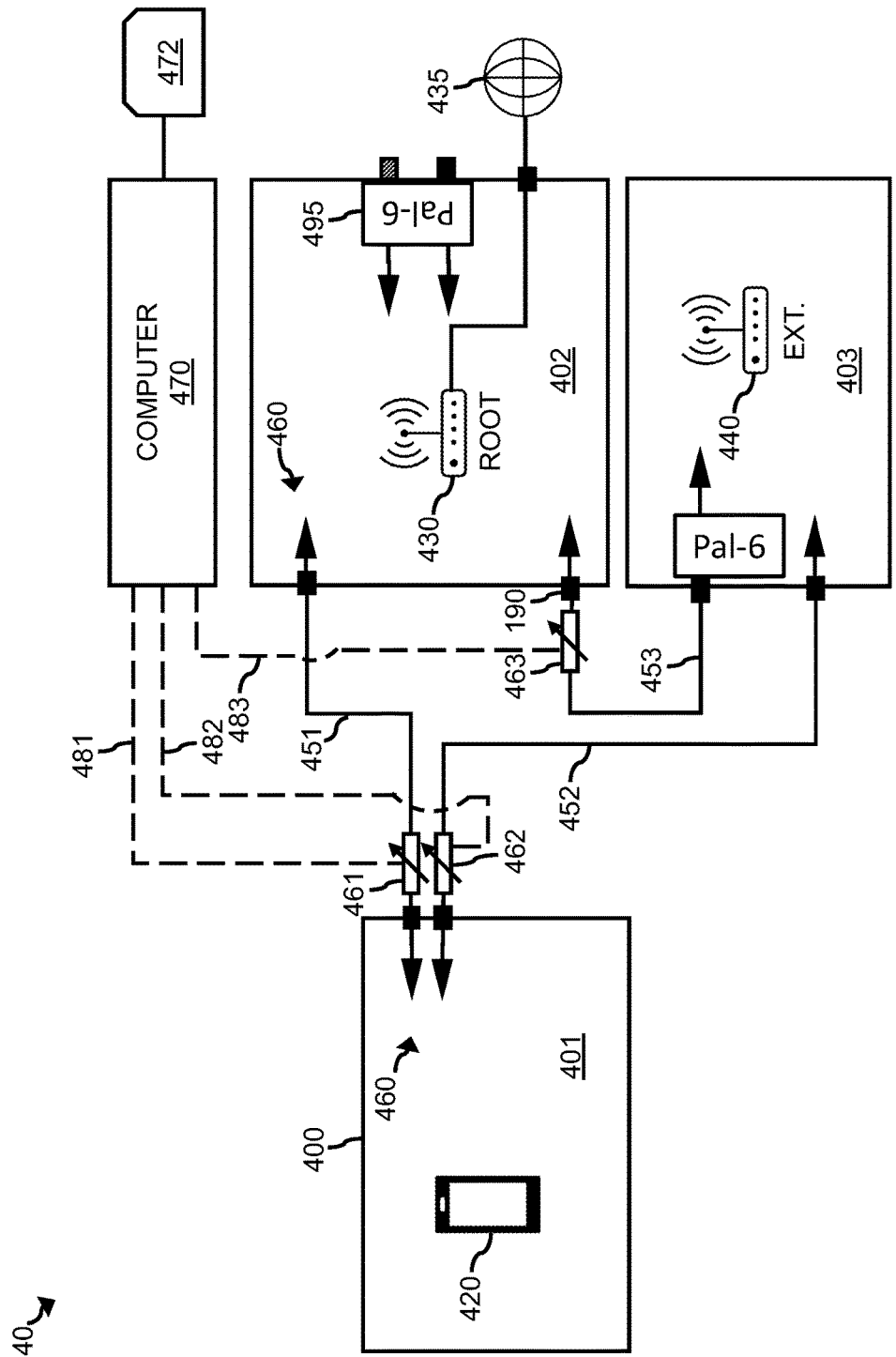
FIG. 4 is a block diagram of a field-to-lab testing system according to an embodiment.

FIG. 4 is a block diagram of a field-to-lab testing system 40 according to an embodiment. The system 40 includes a plurality of electromagnetically-isolated chambers 400 including a first electromagnetically-isolated chamber 401, a second electromagnetically-isolated chamber 402, and a third electromagnetically-isolated chamber 403. A client device 420 (e.g., a station or STA) is disposed in the first electromagnetically-isolated chamber 401, which can alternately be referred to as a client electromagnetically-isolated chamber. A root-wireless access point (AP) 430 is disposed in the second electromagnetically-isolated chamber 402, which can alternately be referred to as a root electromagnetically-isolated chamber. The root AP 430 is a Wi-Fi AP that is coupled via a wired or wireless communication link to the internet 435. A wireless-extender AP 440 is disposed in the third electromagnetically-isolated chamber 403, which can alternately be referred to as an extender electromagnetically-isolated chamber. The root AP 430 and the extender AP 440 can be mesh Wi-Fi node APs that can produce a Wi-Fi network, such as in a home, in a business, or in another environment (e.g., indoors or outside).

The client device 420, the root-wireless AP 430, and the wireless-extender AP 440 are in wired and/or wireless communication with each other. In an embodiment, the client device 420 and the root-wireless AP 430 can be in wireless communication with each other via a first signal line 451 that is electrically coupled to a respective antenna 460 in each electromagnetically-isolated chamber 401, 402. In an alternative embodiment, the first signal line 451 can be coupled to a respective port in the client device 420 and in the root-wireless AP 430 such that the client device 420 and the root-wireless AP 430 are in wired communication with each other. In yet another embodiment, one end of the first signal line 451 can be coupled to an antenna 460 to wireless communicate with the client device 420 or the root-wireless AP 430 and the other end of the first signal line 451 can be coupled to a port in the other device (i.e., the root-wireless AP 430 or the client device 420). The first signal line 451 can comprise a wired and/or a wireless communication path between the client device 420 and the root-wireless AP 430.

In an embodiment, the client device 420 and the wireless-extender AP 440 are in wireless communication with each other via a second signal line 452 that is electrically coupled to a respective antenna 460 in each electromagnetically-isolated chamber 401, 403. In an alternative embodiment, the second signal line 452 can be coupled to a respective port in the client device 420 and in the wireless-extender AP 440 such that the client device 420 and the wireless-extender AP 440 are in wired communication with each other. In yet another embodiment, one end of the second signal line 452 can be coupled to an antenna 460 to wireless communicate with the client device 420 or the wireless-extender AP 440 and the other end of the second signal line 452 can be coupled to a port in the other device (i.e., the wireless-extender AP 440 or the client device 420). The second signal line 452 can comprise a wired and/or a wireless communication path between the client device 420 and the wireless-extender AP 440.

In an embodiment, the root-wireless AP 430 and the wireless-extender AP 440 are in wireless communication with each other via a third signal line 453 that is electrically coupled to a respective antenna 460 in each electromagnetically-isolated chamber 402, 403. In an alternative embodiment, the third signal line 453 can be coupled to a respective port in the root-wireless AP 430 and in the wireless-extender AP 440 such that the root-wireless AP 430 and the wireless-extender AP 440 are in wired communication with each other. In yet another embodiment, one end of the third signal line 453 can be coupled to an antenna 460 to wireless communicate with the root-wireless AP 430 or the wireless-extender AP 440 and the other end of the third signal line 453 can be coupled to a port in the other device (i.e., the wireless-extender AP 440 or the root-wireless AP 430). The third signal line 453 can comprise a wired and/or a wireless communication path between the root-wireless AP 430 and the wireless-extender AP 440.

The electromagnetically-isolated chambers 400 include RF feedthrough ports 190 that allow the signal lines 451-453 to pass while maintaining electromagnetic isolation within the electromagnetically-isolated chambers 400.

A respective programmable attenuator 461-463 is electrically coupled to (e.g., in series with) each signal line 451-453. The programmable attenuators 461-463 have a variable attenuation that can be set by respective control signals that are sent from a computer 470 that is in electrical communication with each programmable attenuator 461-463. The computer 470 can be in wireless or wired communication with each programmable attenuator 461-463. Wired communication links 481-483 between the computer 470 and the programmable attenuators 461-463, respectively, are illustrated in FIG. 4, but any or all of the wired communication links 481-483 can be replaced with wireless communication links.

System 40 can be used to test the client device 420, the root AP 430, and/or the extender AP 440. In-line or monitor wireless link monitors (e.g., sniffers) 495 can be included to detect data throughput, data rate, packet loss, and/or other wireless parameters during testing.

Figure 5:
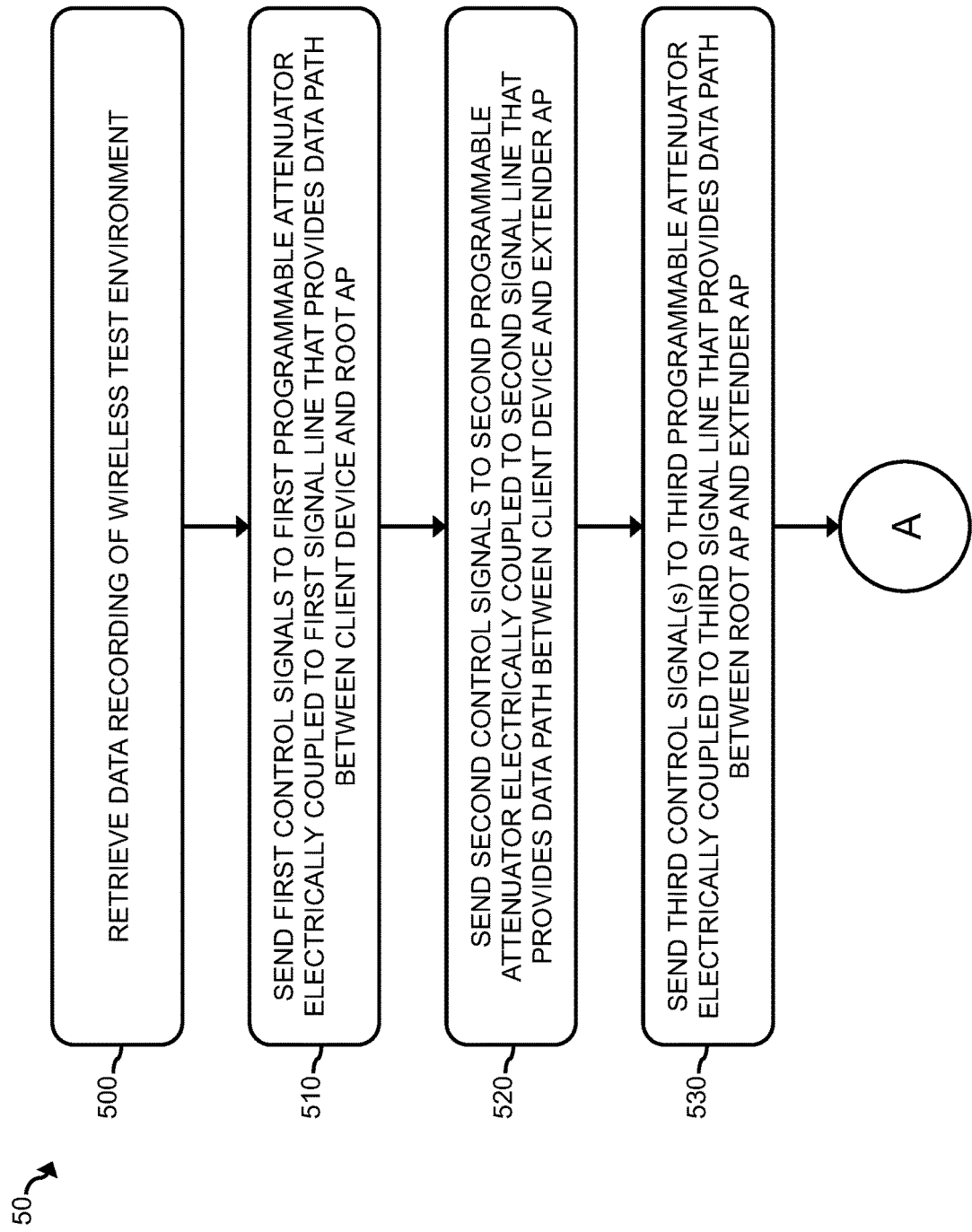
FIG. 5 is a flow chart of a method for field-to-lab testing a wireless device according to an embodiment.
Figure 5:
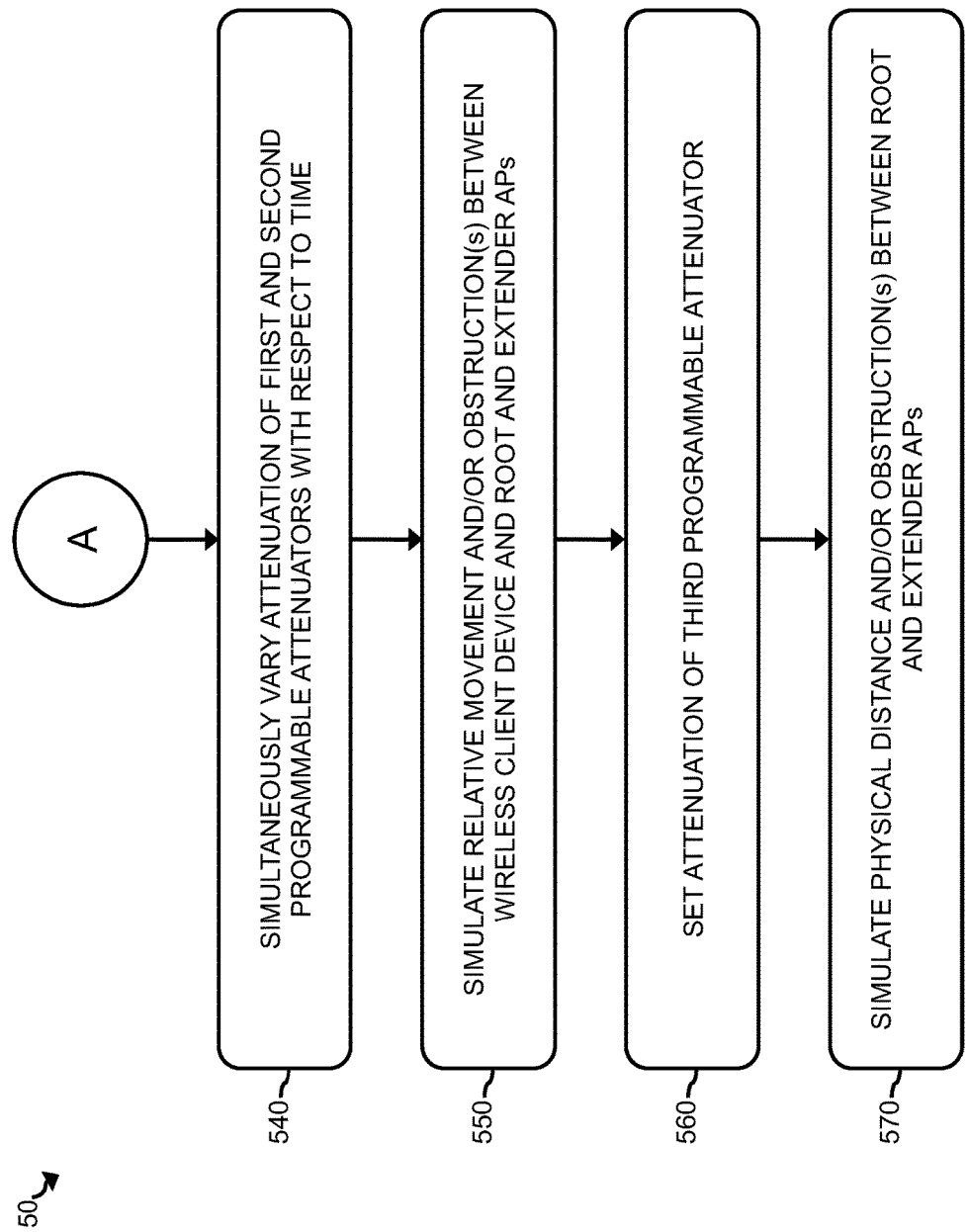

Additional details of system 40 are described with respect to FIG. 5, which is a flow chart of a method 50 for field-to-lab testing of a wireless device according to an embodiment. Method 50 can be performed using system 40 and/or embodied in instructions stored in a computer program product that cause a processor to perform method 50.

In step 500, the computer 470 retrieves from a non-transitory computer readable storage medium 472 (e.g., memory or a computer program product), operatively coupled to the computer 470, data representing a recording of a path (e.g., path 200) through a wireless field test environment, such as the wireless field test environment recorded according to method 10A. The data recording can comprise one or more files. In one embodiment, the data recording represents a continuous path through a wireless testing environment where the path passes within a predetermined radius of each wireless AP. In another embodiment, a first data file represents a continuous path through the wireless testing environment and a second data file represents the physical configuration of the mesh network APs in the wireless testing environment.

In step 510, the computer 470 sends first control signals to the first programmable attenuator 461, which is electrically coupled to the first signal line 451. The first signal line 451 provides a first data communication path between the client device 420 and the root AP 430. In an embodiment, the first signal line 451 is electrically coupled to a respective antenna 460 in the client and root electromagnetically-isolated chambers 401, 402, respectively. The antennas 460 allow the client device 420 and the root AP 430 to be in wireless communication with each other while they are located in the client and root electromagnetically-isolated chambers 401, 402, respectively, thereby allowing the client device 420 and the root AP 430 to transmit wireless signals (e.g., root-client signals) to one another. In another embodiment, the first signal line 451 is electrically coupled to a respective port in the client device 420 and in the root AP 430 to allow the client device 420 and the root AP 430 to be in wired communication with each other while they are located in the client and root electromagnetically-isolated chambers 401, 402, respectively, thereby allowing the client device 420 and the root AP 430 to transmit wired signals (e.g., root-client signals) to one another. The computer 470 can send the first control signals wirelessly or through a wired communication link such as wired communication link 481.

In step 520, the computer 470 sends second control signals to the second programmable attenuator 462, which is electrically coupled to the second signal line 452. The second signal line 452 provides a second data communication path between the client device 420 and the extender AP 440. In an embodiment, the second signal line 452 is electrically coupled to a respective antenna 460 in the client and extender electromagnetically-isolated chambers 401, 403, respectively. The antennas 460 allow the client device 420 and the extender AP 440 to be in wireless communication with each other while they are located in the client and root electromagnetically-isolated chambers 401, 402, respectively, thereby allowing the client device 420 and the extender AP 440 to transmit wireless signals (e.g., extender-client signals) to one another. In another embodiment, the second signal line 452 is electrically coupled to a respective port in the client device 420 and in the extender AP 440 to allow the client device 420 and the extender AP 440 to be in wired communication with each other while they are located in the client and root electromagnetically-isolated chambers 401, 402, respectively, thereby allowing the client device 420 and the extender AP 440 to transmit wired signals (e.g., extender-client signals) to one another. The computer 470 can send the second control signals wirelessly or through wired communication link 482.

In step 530, the computer 470 sends one or more third control signals to the third programmable attenuator 463, which is electrically coupled to the third signal line 453. The third signal line 453 provides a third data communication path between the root AP 430 and the extender AP 440. In an embodiment, the third signal line 453 is electrically coupled to a respective antenna 460 in the root and extender electromagnetically-isolated chambers 402, 403, respectively. The antennas 460 allow the root AP 430 and the extender AP 440 to be in wireless communication with each other while they are located in the root and extender electromagnetically-isolated chambers 402, 403, respectively, thereby allowing the root AP 430 and the extender AP 440 to transmit wireless signals (e.g., root-extender signals) to one another. In another embodiment, the third signal line 453 is electrically coupled to a respective port in the root AP 430 and in the extender AP 440 to allow the root AP 430 and the extender AP 440 to be in wired communication with each other while they are located in the client and root electromagnetically-isolated chambers 401, 402, respectively, thereby allowing the root AP 430 and the extender AP 440 to transmit wired signals (e.g., root-extender signals) to one another. The computer 470 can send the third control signals wirelessly or through wired communication link 483.

The first, second, and third control signals sent in steps 510-530 are produced by the computer 470 using the path-loss data in the wireless test environment recording retrieved in step 500.

In step 540 (via placeholder A), the attenuation of the first and second programmable attenuators 461, 462 is simultaneously and independently varied based on the first and second control signals, respectively. The variation in the attenuation of the first programmable attenuator 461 causes the signal strength or power (e.g., the RSSI) of the wired or wireless signals sent between the root AP 430 and the client device 420 to be varied accordingly. The variation in the attenuation of the second programmable attenuator 462 causes the signal strength or power (e.g., RSSI) of the wired or wireless signals sent between the extender AP 440 and the client device 420 to be varied accordingly.

In step 550, the simultaneous variation in attenuation of the first and second programmable attenuators 461, 462 and the corresponding simultaneous signal strength variation of the wired or wireless signals between the root AP 430 and the client device 420 and between the extender AP 440 and the client device 420 simulates and/or reproduces the path-loss measurements recorded as the wireless link monitor 210 was moved in the field test environment 220. Additionally or alternatively, the simultaneous signal strength variation of the wired or wireless signals sent between the root AP 430 and the client device 420 and/or between the extender AP 440 and the client device 420 can simulate and/or reproduce one or more physical obstructions between the client device (e.g., wireless link monitor 210) and the root AP 230 and/or between the client device (e.g., wireless link monitor 210) and the extender AP 231, respectively, that occurred as the client device (e.g., wireless link monitor 210) was moved along path 200 in the field test environment 220.

The simultaneous signal strength variation of the wired or wireless signals transmitted between the root AP 430 and the client device 420 and between the extender AP 440 and the client device 420 can reproduce, from the perspective of the client device 420, the movement of the wireless link monitor 210 along the path 200 in the field test environment 220. For example, the simultaneous signal strength variation of the wired or wireless signals between the root AP 430 and the client device 420 and between the extender AP 440 and the client device 420 can cause the client device 420 to "experience" the testing conditions of the field test environment 220 while being under the controlled conditions of the field-to-lab testing system 40.

The simultaneous variation in attenuation of the first and second programmable attenuators 461, 462 and the corresponding simultaneous signal strength variation of the wired or wireless signals between the root AP 430 and the client device 420 and between the extender AP 440 and the client device 420 can reproduce, from the perspective of the client device 420, the movement of the wireless link monitor 210 along the path 200 in the field test environment 220 at the same speed that the wireless link monitor 210 travelled along the path 200 or at a different (faster or slower) speed. In another embodiment, the attenuation of the first and second programmable attenuators 461, 462 can be set to reproduce any discrete point or location along the path 200, which can reproduce a stationary position of the wireless link monitor 210 at any point/location along the path 200, such as a room 225 or one or more discrete locations/positions in a room 225 (e.g., location D).

In step 560, the attenuation of the third programmable attenuator 463 is set based on the third control signal(s). The attenuation of the third programmable attenuator 463 causes the signal strength or power (e.g., the RSSI) of the wired or wireless signals sent between the root AP 430 and the extender AP 440 to be set accordingly. In step 570, the signal strength of the wired or wireless signals between the root AP 430 and the extender AP 440 simulates and/or reproduces the physical configuration of the field test environment (e.g., the physical distance and/or one or more physical obstructions between the root AP 230 and the extender AP 231 in the field test environment 220). The physical distance and/or one or more physical obstructions between the root AP 230 and the extender AP 231 can be an effective distance (e.g., an effective RF distance) between the root AP 230 and the extender AP 231. Thus, the signal strength or power of the wired or wireless signals sent between each mesh network node 430, 440 reproduces the physical configuration of the mesh network nodes 230, 231 in the field test environment 220.

The signal strength of the wired or wireless signals transmitted between the root AP 430 and the extender AP 440 can reproduce, from the perspective of the root AP 230, the effective distance between the root AP 230 and the extender AP 231, which allows the field-to-lab testing system 40 to reproduce the same wireless mesh configuration as in the field test environment 220.

System 40 and method 50 can be extended to additional mesh nodes. For example, system 60 in FIG. 6 includes three mesh nodes. In system 60, extender AP 440 is a first extender AP located in a first extender electromagnetically-isolated chamber 403, and system 60 further includes a second extender AP 650 located in a second extender electromagnetically-isolated chamber 604. The client device 420, the root-wireless AP 430, the first wireless-extender AP 440, and the second wireless-extender AP 650 can be in wireless or wired communication with each other. The client device 420, the root-wireless AP 430, and the first wireless-extender AP 440 are in wireless or wired communication with each other in the same manner as described with respect to system 40 and method 50, which is not repeated here for the sake of brevity.

In an embodiment, the client device 420 and the second wireless-extender AP 650 are in wireless communication with each other via a fourth signal line 654 that is electrically coupled to a respective antenna 460 in each electromagnetically-isolated chamber 401, 604. In an alternative embodiment, the fourth signal line 654 can be coupled to a respective port in the client device 420 and in the second wireless-extender AP 650 such that the client device 420 and the second wireless-extender AP 650 are in wired communication with each other. In yet another embodiment, one end of the fourth signal line 654 can be coupled to an antenna 460 in electromagnetically-isolated chamber 401 or 604 to wirelessly communicate with the client device 420 or with the second wireless-extender AP 650, respectively, and the other end of the fourth signal line 654 can be coupled to a port in the other device (i.e., the second wireless-extender AP 650 or the client device 420). The fourth signal line 654 can comprise a wired and/or a wireless data communication path between the root-wireless AP 430 and the wireless-extender AP 440.

In an embodiment, the root-wireless AP 430 and the second wireless-extender AP 650 are in wireless communication with each other via a fifth signal line 655 that is electrically coupled to a respective antenna 460 in each electromagnetically-isolated chamber 402, 604. In an alternative embodiment, the fifth signal line 655 can be coupled to a respective port in the root-wireless AP 430 and in the second wireless-extender AP 650 such that the root-wireless AP 430 and the second wireless-extender AP 650 are in wired communication with each other. In yet another embodiment, one end of the fifth signal line 655 can be coupled to an antenna 460 in electromagnetically-isolated chamber 402 or 604 to wireless communicate with the root-wireless AP 430 or the second wireless-extender AP 650, respectively, and the other end of the fifth signal line 655 can be coupled to a port in the other device (i.e., the second wireless-extender AP 650 or the root-wireless AP 430). The fifth signal line 655 can comprise a wired and/or a wireless data communication path between the root-wireless AP 430 and the second wireless-extender AP 650.

In an embodiment, the first wireless-extender AP 440 and the second wireless-extender AP 650 are in wireless communication with each other via a sixth signal line 656 that is electrically coupled to a respective antenna 460 in each electromagnetically-isolated chamber 403, 604. In an alternative embodiment, the sixth signal line 656 can be coupled to a respective port in the first wireless-extender AP 440 and in the second wireless-extender AP 650 such that the first wireless-extender AP 440 and the second wireless-extender AP 650 are in wired communication with each other. In yet another embodiment, one end of the sixth signal line 656 can be coupled to an antenna 460 in electromagnetically-isolated chamber 403 or 604 to wireless communicate with the first wireless-extender AP 440 or the second wireless-extender AP 650, respectively, and the other end of the sixth signal line 656 can be coupled to a port in the other device (i.e., the second wireless-extender AP 650 or the first wireless-extender AP 440). The sixth signal line 656 can comprise a wired and/or a wireless data communication path between the first wireless-extender AP 440 and the second wireless-extender AP 650.

Figure 6:
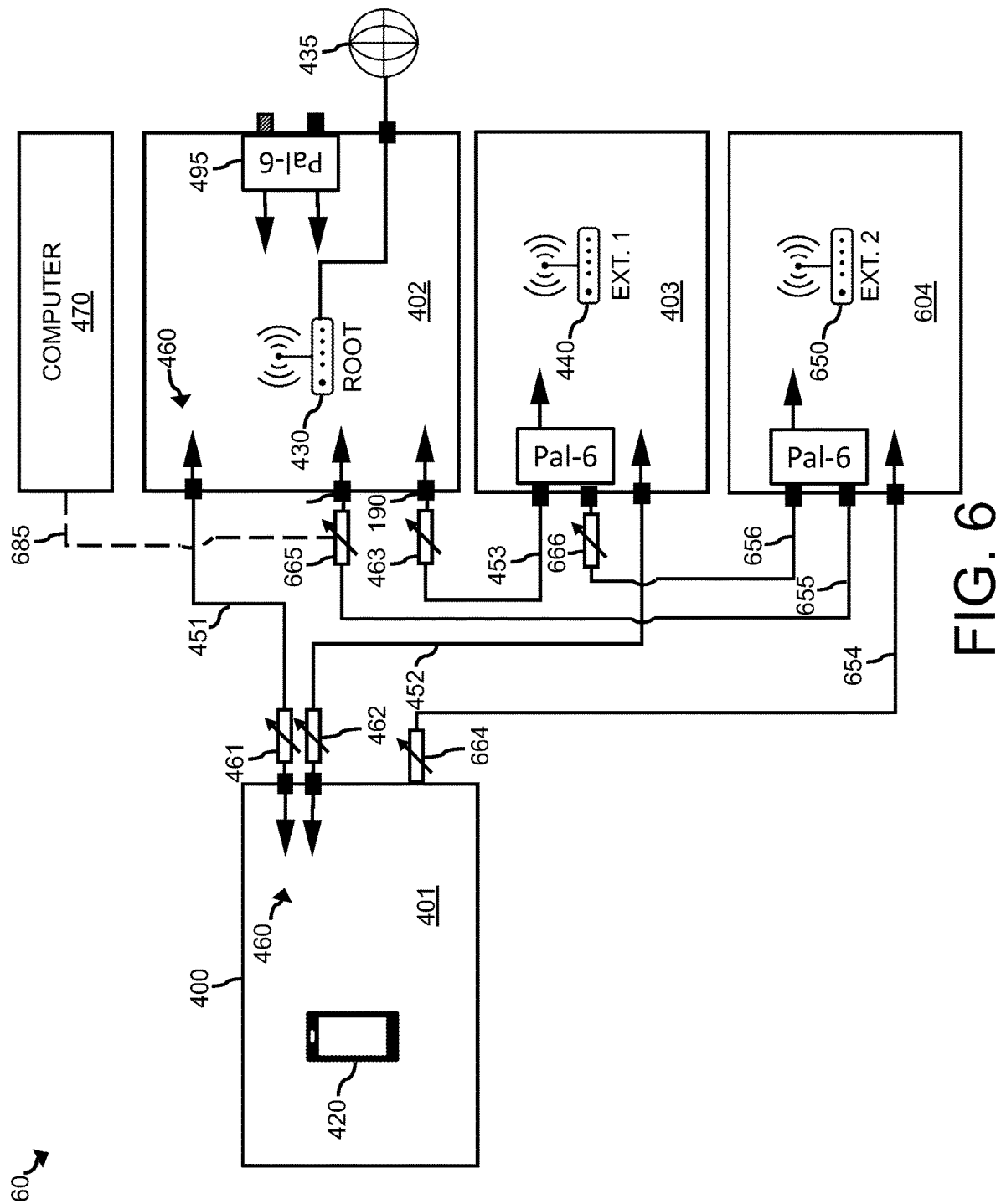
FIG. 6 is a block diagram of a field-to-lab testing system according to another embodiment.

A respective programmable attenuator 664-666 is electrically coupled to (e.g., in series with) each signal line 654-656. The programmable attenuators 664-666 can be the same as programmable attenuators 461-463. The variable attenuation of the programmable attenuators 664-666 can be set by respective control signals that are sent from the computer 470 that is in electrical communication with each programmable attenuator 664-666. An example wired communication link 685 between the computer 470 and fifth programmable attenuator 665 is illustrated in FIG. 6. The wired communication links between the computer 470 and fourth and sixth programmable attenuators 264, 266 are not illustrated in FIG. 6 for clarity purposes only. Any or all of the wired communication links can be replaced with wireless communication links. Wired communication links 481-483 are not illustrated in FIG. 6 for clarity purposes only.

System 60 can be used to test the client device 420, the root AP 430, the first extender AP 440, and/or the second extender AP 650.

Additional details of system 60 are described with respect to FIG. 7, which is a flow chart of a method 70 for testing a wireless device according to an embodiment. Method 70 can be performed using system 60 and/or embodied in instructions stored in a computer program product that cause a processor to perform method 70. Steps 500-530 are the same as described above except that the extender AP 440 is a first extender AP 440 disposed in a first extender electromagnetically-isolated chamber 403.

In step 740 (via placeholder A), the computer 470 sends fourth control signals to the fourth programmable attenuator 664, which is electrically coupled to the fourth signal line 654. The fourth signal line 654 provides a fourth data communication path between the client device 420 and the second extender AP 650. In an embodiment, the fourth signal line 654 is electrically coupled to a respective antenna 460 in the client and second extender electromagnetically-isolated chambers 401, 604, respectively. The antennas 460 and the fourth signal line 654 allow the client device 420 and the second extender AP 650 to be in wireless communication with each other while they are located in the client and second extender electromagnetically-isolated chambers 401, 604, respectively, thereby allowing the client device 420 and the second extender AP 650 to transmit wireless signals (e.g., second extender-client signals) to one another. In another embodiment, the fourth signal line 654 is electrically coupled to a respective port in the client device 420 and in the second extender AP 650 to allow the client device 420 and the second extender AP 650 to be in wired communication with each other while they are located in the client and second extender electromagnetically-isolated chambers 401, 604, respectively, thereby allowing the client device 420 and the second extender AP 650 to transmit wired signals (e.g., second extender-client signals) to one another. The computer 470 can send the fourth control signals wirelessly or through a wired communication link.

In step 750, the computer 470 sends one or more fifth control signals to the fifth programmable attenuator 665, which is electrically coupled to the fifth signal line 655. The fifth signal line 654 provides a fifth data communication path between the root AP 430 and the second extender AP 650. In an embodiment, the fifth signal line 655 is electrically coupled to a respective antenna 460 in the root and second extender electromagnetically-isolated chambers 402, 604, respectively. The antennas 460 and the fifth signal line 655 allow the root AP 430 and the second extender AP 650 to be in wireless communication with each other while they are located in the root and second extender electromagnetically-isolated chambers 402, 604, respectively, thereby allowing the root AP 430 and the second extender AP 650 to transmit wireless signals (e.g., root-second-extender signals) to one another. In another embodiment, the fifth signal line 655 is electrically coupled to a respective port in the root AP 430 and in the second extender AP 650 to allow the root AP 430 and the second extender AP 650 to be in wired communication with each other while they are located in the root and second extender electromagnetically-isolated chambers 402, 604, respectively, thereby allowing the root AP 430 and the second extender AP 650 to transmit wired signals (e.g., root-second-extender signals) to one another. The computer 470 can send the fifth control signal(s) wirelessly or through wired communication link 685.

In step 760, the computer 470 sends one or more sixth control signals to the sixth programmable attenuator 666, which is electrically coupled to the sixth signal line 656. The sixth signal line 656 provides a sixth data communication path between the first extender AP 440 and the second extender AP 650. In an embodiment, the sixth signal line 656 is electrically coupled to a respective antenna 460 in the first and second extender electromagnetically-isolated chambers 403, 604, respectively. The antennas 460 and the sixth signal line 655 allow the first extender AP 440 and the second extender AP 650 to be in wireless communication with each other while they are located in the first and second extender electromagnetically-isolated chambers 403, 604, respectively, thereby allowing the first extender AP 440 and the second extender AP 650 to transmit wireless signals (e.g., first-second-extender signals) to one another. In another embodiment, the sixth signal line 656 is electrically coupled to a respective port in the first extender AP 440 and in the second extender AP 650 to allow the first extender AP 440 and the second extender AP 650 to be in wired communication with each other while they are located in the first and second extender electromagnetically-isolated chambers 403, 604, respectively, thereby allowing the first extender AP 440 and the second extender AP 650 to transmit wired signals (e.g., first-second-extender signals) to one another. The computer 470 can send the sixth control signal(s) wirelessly or through a wired communication link.

The control signals sent in steps 510-530 and in steps 740-760 are produced by the computer 470 using the path-loss data in the wireless test environment recording retrieved in step 500.

In step 770 (via placeholder B), the attenuations of the first, second, and fourth programmable attenuators 461, 462, 664 are simultaneously and independently varied based on the first, second, and fourth control signals, respectively. The variation in the attenuation of the first programmable attenuator 461 causes the signal strength or power (e.g., RSSI) of the wired or wireless signals sent between the root AP 430 and the client device 420 to be varied accordingly. The variation in the attenuation of the second programmable attenuator 462 causes the signal strength or power (e.g., RSSI) of the wired or wireless signals sent between the first extender AP 440 and the client device 420 to be varied accordingly. The variation in the attenuation of the fourth programmable attenuator 664 causes the signal strength or power (e.g., RSSI) of the wired or wireless signals sent between the second extender AP 650 and the client device 420 to be varied accordingly.

In step 780, the simultaneous variation in attenuation of the first, second, and fourth programmable attenuators 461, 462, 664 and the corresponding simultaneous signal strength variation of the wireless signals sent between the root AP 430 the client device 420, between the first extender AP 440 and the client device 420, and between the second extender AP 650 and the client device 420, respectively, simulates and/or reproduces the path-loss measurements recorded during as the client device (e.g., wireless link monitor 210) was moved along path 200 in the field test environment 220. Additionally or alternatively, the corresponding simultaneous signal strength variation of the wired or wireless signals sent between the root AP 430 the client device 420, between the first extender AP 440 and the client device 420, and between the second extender AP 650 and the client device 420, can simulate and/or reproduce one or more physical obstructions between the client device (e.g., wireless link monitor) and the root AP 230, between the client device (e.g., wireless link monitor) and the first extender AP 231, and/or between the client device (e.g., wireless link monitor) and the second extender AP 232, respectively, that occurred as the client device (e.g., wireless link monitor 210) was moved along path 200 in the field test environment 220.

The simultaneous signal strength variation of the wired or wireless signals transmitted between the root AP 430 and the client device 420, between the first extender AP 440 and the client device 420, and between the second extender AP 650 and the client device 420 can reproduce, from the perspective of the client device 420, the movement of the wireless link monitor 210 along the path 200 in the field test environment 220. For example, the simultaneous signal strength variation of the wired or wireless signals between the root AP 430 and the client device 420, between the first extender AP 440 and the client device 420, and between the second extender AP 650 and the client device 420 can cause the client device 420 to "experience" the testing conditions of the field test environment 220 while being under the controlled conditions of the field-to-lab testing system 60.

In step 790, the attenuation of the third, fifth, and sixth programmable attenuators 463, 665, 666 is set based on the third, fifth, and sixth control signals, respectively. The attenuation of the third programmable attenuator 463 causes the signal strength or power (e.g., the RSSI) of the wireless signals between the root AP 430 and the first extender AP 440 to be set accordingly. The attenuation of the fifth programmable attenuator 665 causes the signal strength or power (e.g., the RSSI) of the wireless signals sent between the root AP 430 and the second extender AP 650 to be set accordingly. The attenuation of the sixth programmable attenuator 666 causes the signal strength or power (e.g., the RSSI) of the wired or wireless signals sent between the first extender AP 440 and the second extender AP 650 to be set accordingly.

In step 795, the signal strength or power of the wired or wireless signals sent between the root AP 430 and the first extender AP 440 simulates and/or reproduces the physical distance and/or one or more physical obstructions (e.g., the effective distance) between the root AP 230 and the first extender AP 231 in the field test environment 220. The signal strength or power of the wired or wireless signals sent between the root AP 430 and the second extender AP 650 simulates and/or reproduces the physical distance and/or one or more physical obstructions between the root AP 230 and the second extender AP 232 in the field test environment 220. The signal strength or power of the wired or wireless signals sent between the first extender AP 440 and the second extender AP 650 simulates and/or reproduces the physical distance and/or one or more physical obstructions between the first extender AP 231 and the second extender AP 232 in the field test environment 220. Thus, the signal strength or power of the wired or wireless signals sent between each mesh network node 430, 440, 650 reproduces the configuration of the mesh network nodes 230-232 in the field test environment 220.

The signal strength of the wired or wireless signals transmitted between the root AP 430 and the first extender AP 440, between the root AP 430 and the second extender AP 650, and between the first and second extender APs 440, 650 can reproduce, from the perspective of the root AP 230, the effective distance between the root AP 230 and the first extender AP 231 and between the root AP 230 and the second extender AP 232, which allows the field-to-lab testing system 60 to reproduce the same wireless mesh configuration as in the field test environment 220.

Figure 8:
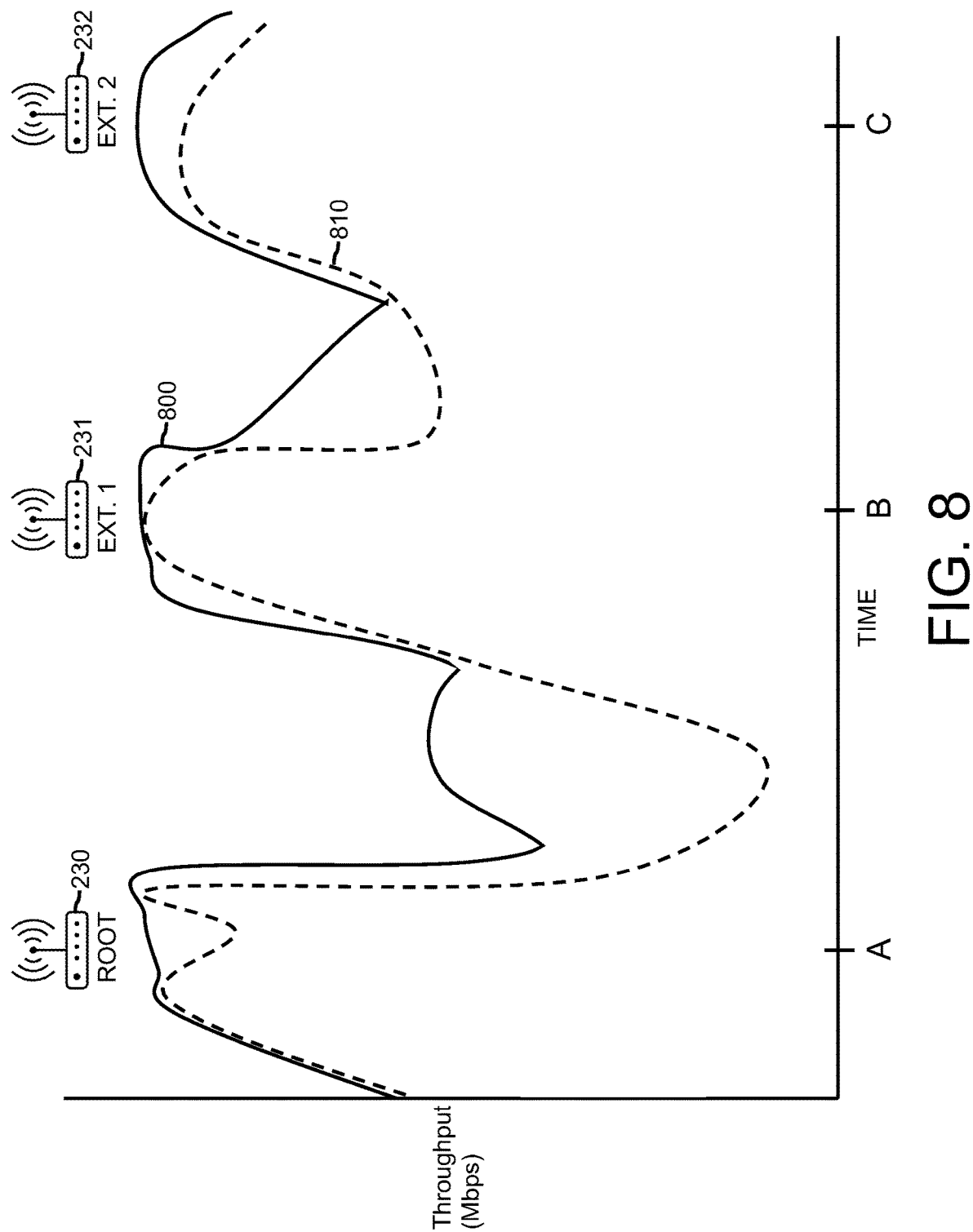
FIG. 8 is a graph that illustrates maximum-achievable data throughput and actual data throughput of a test device.

The wireless link monitors 210, 495 can measure data throughput and data rate, as discussed above. In an embodiment, the data throughput and/or data rate of the client device 420 using field-to-lab testing system 40, 60 during the simulated movement along the path 200 can be compared to the theoretical maximum-achievable data throughput and/or theoretical maximum-achievable data rate, as measured by the wireless link monitor 210 in the field test environment 220, to determine the performance of the device-under-test (e.g., client device 420, root AP 430, etc.). Since the wireless link monitor 210 can simultaneously measure the data throughput and/or data rate from each mesh network node 230-232 in the field test environment 220, the theoretical maximum-achievable data throughput and/or theoretical maximum-achievable data rate is the maximum of the data throughputs and/or data rates at any given time from any of the mesh network node 230-232. For example, referring to FIG. 3, the maximum-achievable data throughput 800 for all mesh network nodes 230-232 as the wireless link monitor 210 is moved along the path 200 in in the field test environment 220 is illustrated in FIG. 8. The achievable data throughput 810 available to the client device 420 can then be compared as a performance measure of the device-under-test (e.g., client device 420 and/or mesh network node 430, 440, 650) in system 40, 60.

Figure 9:
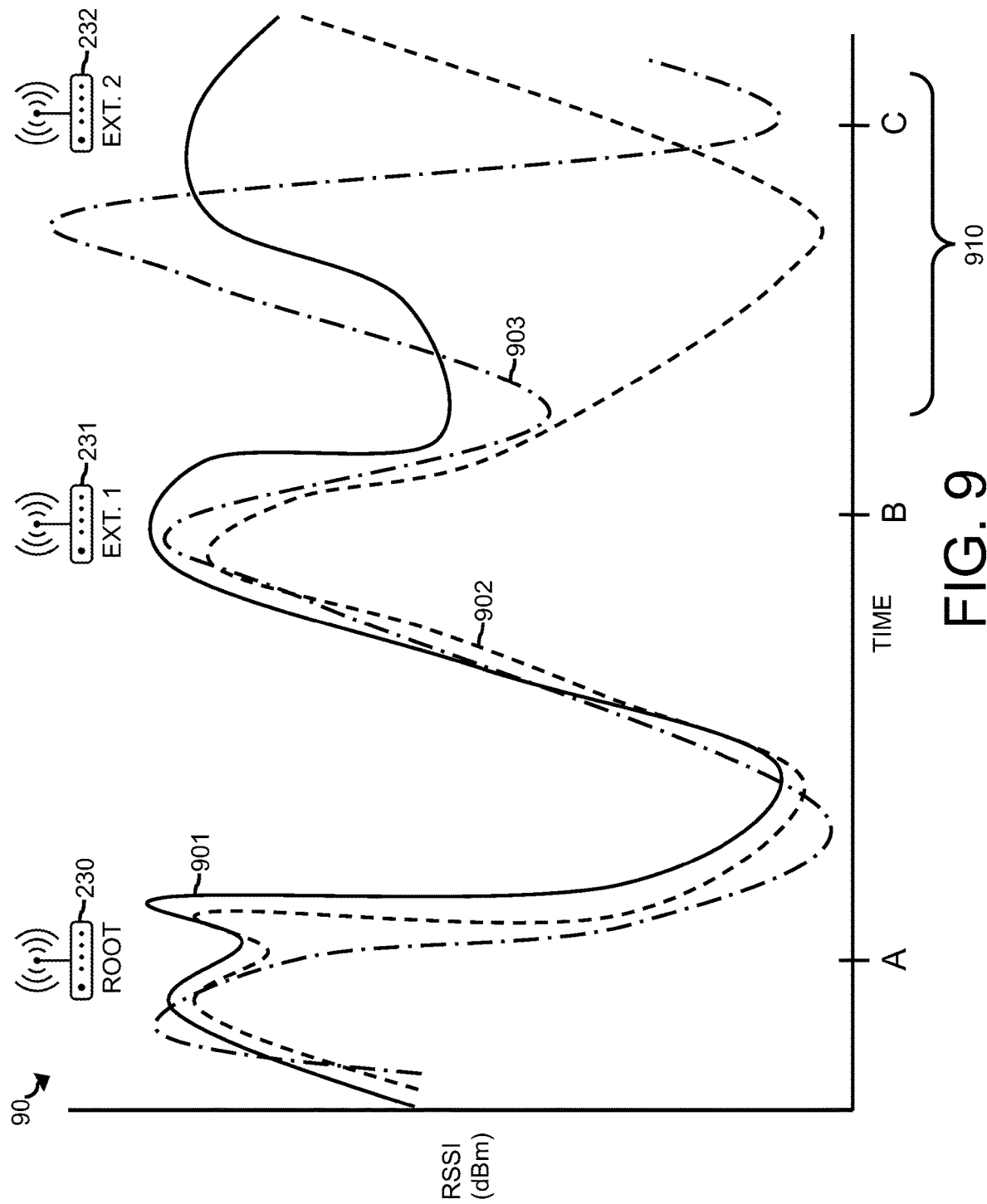
FIG. 9 is a graph that illustrates the actual data throughput of a test device over multiple test runs.

Performance can also be characterized across test runs along path 200 using field-to-lab testing system 40, 60, which can indicate statistical and/or run-to-run variations. For example, FIG. 9 illustrates a graph 90 of data throughput available to the client device versus time on test runs 901-903. Time period 910 indicates a run-to-run variation that appears to occur when the client device is simulated to appear close to the second extender AP node 232.

Figure 10:
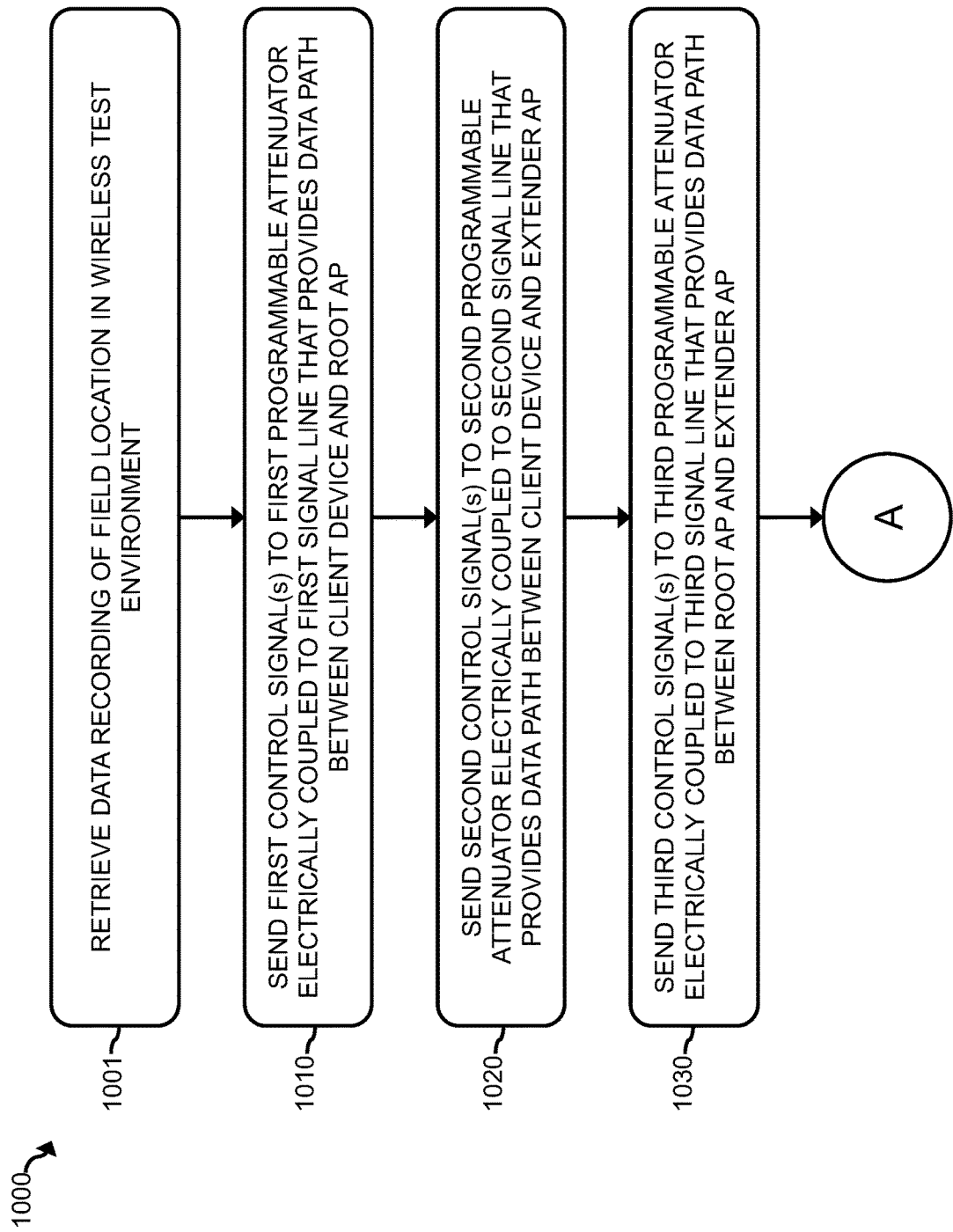
FIG. 10 is a flow chart of a method for field-to-lab testing of a wireless device according to another embodiment
Figure 10:
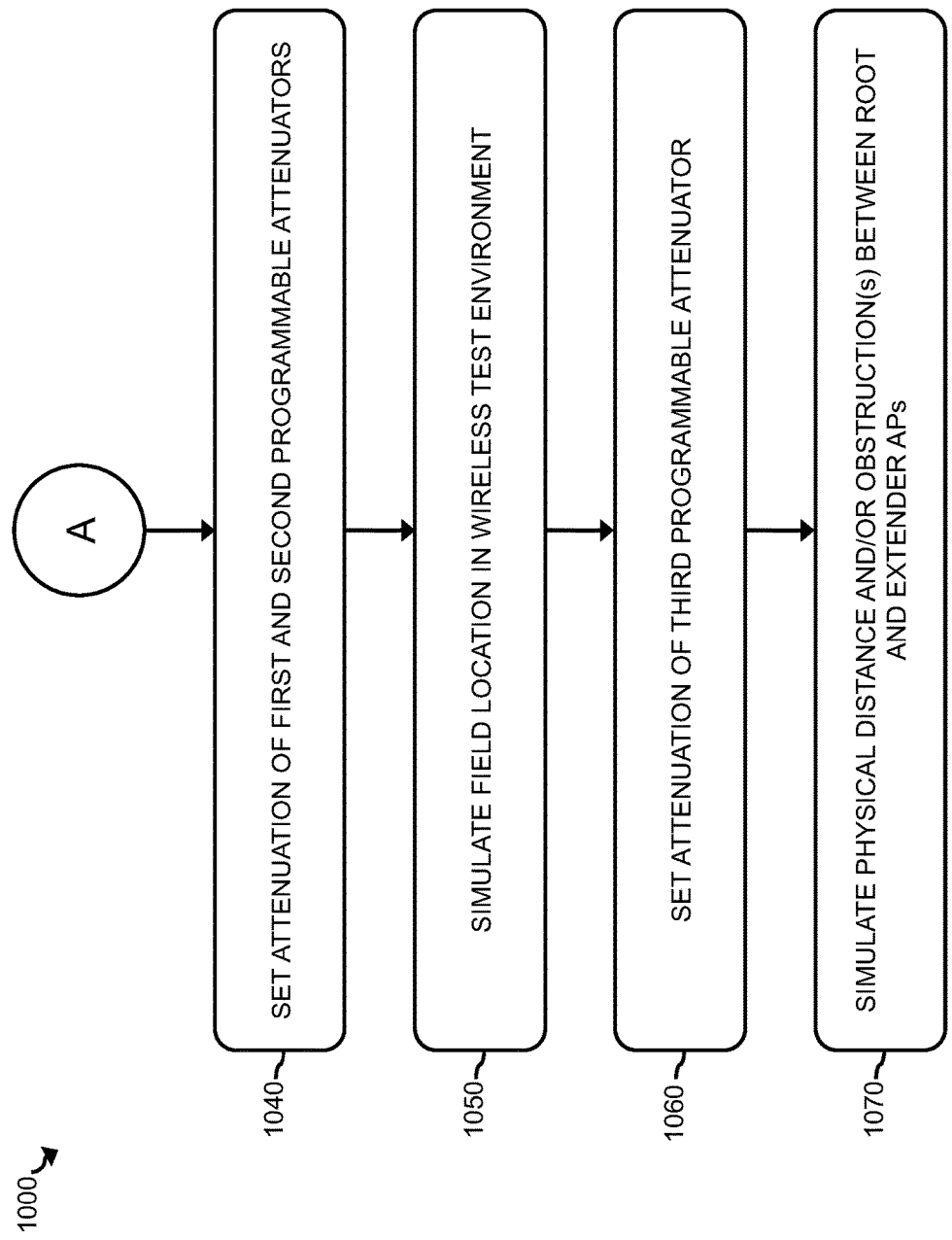

FIG. 10 is a flow chart of a method 1000 for field-to-lab testing of a wireless device according to another embodiment. Method 1000 can be performed using system 40 and/or embodied in instructions stored in a computer program product that cause a processor to perform method 1000.

In step 1001, the computer 470 retrieves from a non-transitory computer readable storage medium 472 (e.g., memory or a computer program product), operatively coupled to the computer 470, data representing a recording of a field location, such as a room, in a wireless field test environment. For example, the recording can represent location D in room 225 and/or path 250 in room 225 in field test environment 220, which can be recorded according to method 10B. The data recording can comprise one or more files. For example, the data recording can include a first data file that represents a room or location in a wireless testing environment and a second data file represents the physical configuration of the mesh network APs in the wireless testing environment.

In step 1010, the computer 470 sends one or more first control signals to the first programmable attenuator 461, which is electrically coupled to the first signal line 451. The first signal line 451 provides a first data communication path between the client device 420 and the root AP 430 in the client and root electromagnetically-isolated chambers 401, 402, respectively, such that they are in wireless or wired communication with each other, as discussed above.

In step 1020, the computer 470 sends one or more second control signals to the second programmable attenuator 462, which is electrically coupled to the second signal line 452. The second signal line 452 provides a second data communication path between the client device 420 and the extender AP 440 in the client and extender electromagnetically-isolated chambers 401, 403, respectively, such that they are in wireless or wired communication with each other, as discussed above.

In step 1030, the computer 470 sends one or more third control signals to the third programmable attenuator 463, which is electrically coupled to the third signal line 453. The third signal line 453 provides a third data communication path between the root AP 430 and the extender AP 440 in the root and extender electromagnetically-isolated chambers 402, 403, respectively, such that they are in wireless or wired communication with each other, as discussed above.

In step 1040, the attenuation of the first and second programmable attenuators 461, 462 is set based on the first and second control signals. The attenuation of the first programmable attenuator 461 causes the signal strength or power (e.g., the RSSI) of the wired or wireless signals sent between the root AP 430 and the client device 420 to be set accordingly. The attenuation of the second programmable attenuator 462 causes the signal strength or power (e.g., RSSI) of the wired or wireless signals sent between the extender AP 440 and the client device 420 to be set accordingly.

In step 1050, the attenuation of the first and second programmable attenuators 461, 462 and the corresponding signal strength setting of the wired or wireless signals between the root AP 430 and the client device 420 and between the extender AP 440 and the client device 420 simulates and/or reproduces, from the perspective of the client device 420, the field location (e.g., of the wireless link monitor 210) in the field test environment 220. Additionally or alternatively, the corresponding signal strength setting of the wired or wireless signals of the wired or wireless signals sent between the root AP 430 and the client device 420 and/or between the extender AP 440 and the client device 420 can simulate and/or reproduce the effective distance (e.g., effective RF distance) between the wireless link monitor 210 and the root AP 230 and/or between the wireless link monitor 210 and the extender AP 231, respectively, at the field location of the wireless link monitor 210 in the field test environment 220.

In step 1060, the attenuation of the third programmable attenuator 463 is set based on the third control signal(s). The attenuation of the third programmable attenuator 463 causes the signal strength or power (e.g., the RSSI) of the wired or wireless signals sent between the root AP 430 and the extender AP 440 to be set accordingly. In step 1070, the signal strength of the wired or wireless signals between the root AP 430 and the extender AP 440 simulates and/or reproduces the physical configuration of the field test environment (e.g., the physical distance and/or one or more physical obstructions between the root AP 230 and the extender AP 231 in the field test environment 220). The physical distance and/or one or more physical obstructions between the root AP 230 and the extender AP 231 can be an effective distance (e.g., an effective RF distance) between the root AP 230 and the extender AP 231. Thus, the signal strength or power of the wired or wireless signals sent between each mesh network node 430, 440 reproduces the physical configuration of the mesh network nodes 230, 231 in the field test environment 220.

The first, second, and third control signals sent in steps 1010-1030 are produced by the computer 470 using the path-loss data in the wireless test environment recording retrieved in step 1001.

The signal strength of the wired or wireless signals transmitted between the root AP 430 and the extender AP 440 can reproduce, from the perspective of the root AP 230, the effective distance between the root AP 230 and the extender AP 231, which allows the field-to-lab testing system 40 to reproduce the same wireless mesh configuration as in the field test environment 220.

Figure 11:
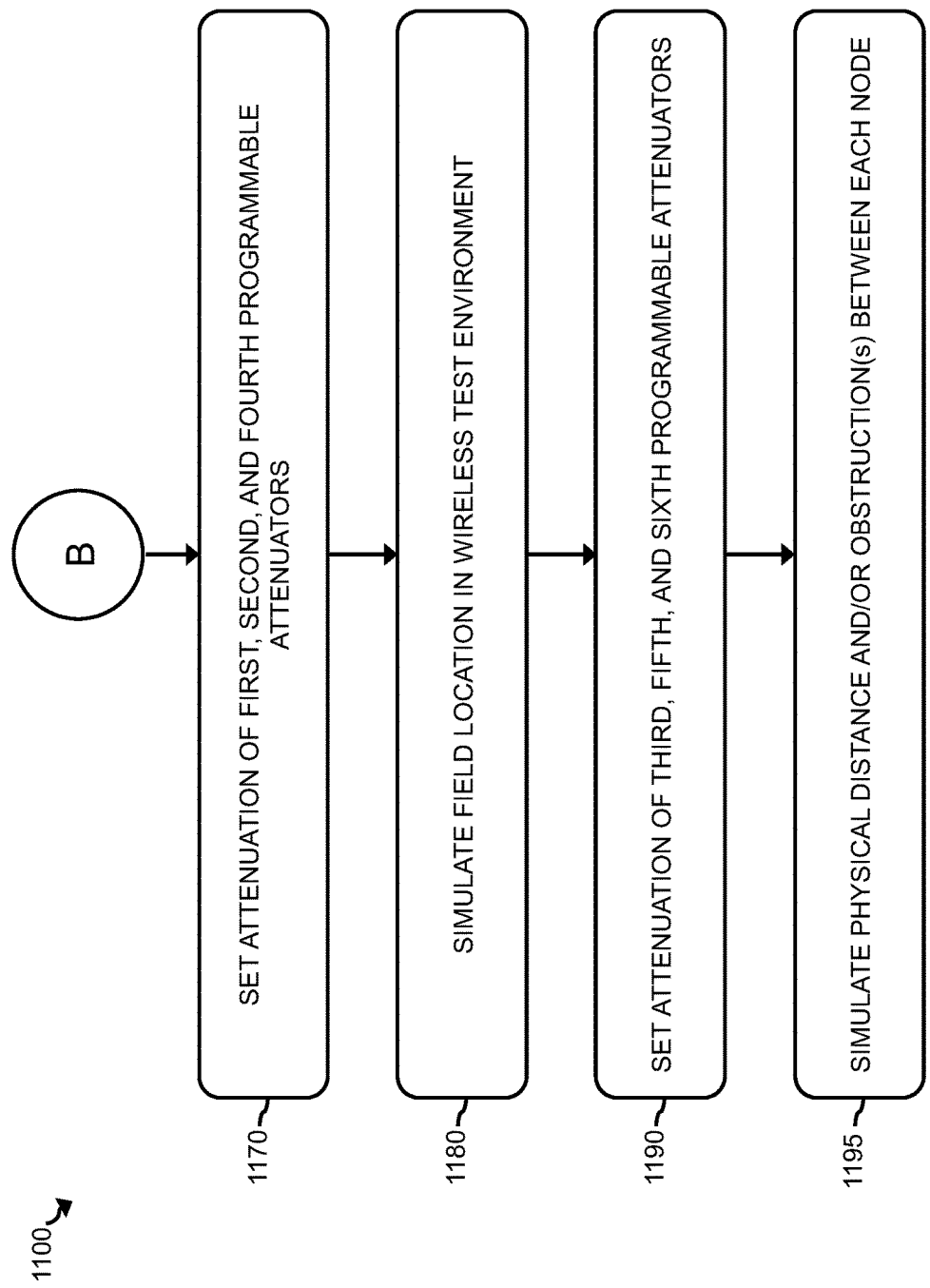
FIG. 11 is a flow chart of a method for field-to-lab testing a wireless device according to another embodiment

FIG. 11 is a flow chart of a method 1100 for field-to-lab testing a wireless device according to another embodiment. Method 1000 can be performed using system 60 and/or embodied in instructions stored in a computer program product that cause a processor to perform method 1100. Steps 1001-1030 are the same as described above except that the extender AP 440 is a first extender AP 440 disposed in a first extender electromagnetically-isolated chamber 403.

In step 1140 (via placeholder A), the computer 470 sends fourth control signals to the fourth programmable attenuator 664, which is electrically coupled to the fourth signal line 654. The fourth signal line 654 provides a fourth data communication path between the client device 420 and the second extender AP 650 in the client and second extender electromagnetically-isolated chambers 401, 604, respectively, such that they are in wireless or wired communication with each other, as discussed above.

In step 1150, the computer 470 sends one or more fifth control signals to the fifth programmable attenuator 665, which is electrically coupled to the fifth signal line 655. The fifth signal line 654 provides a fifth data communication path between the root AP 430 and the second extender AP 650 in the root and second extender electromagnetically-isolated chambers 402, 604, respectively, such that they are in wireless or wired communication with each other, as discussed above.

In step 1160, the computer 470 sends one or more sixth control signals to the sixth programmable attenuator 666, which is electrically coupled to the sixth signal line 656. The sixth signal line 656 provides a sixth data communication path between the first extender AP 440 and the second extender AP 650 in the first and second extender electromagnetically-isolated chambers 403, 604, respectively, such that they are in wireless or wired communication with each other, as discussed above.

In step 1170, the attenuation of the first, second, and fourth programmable attenuators 461, 462, 664 is set based on the first, second, and fourth control signals, respectively. The attenuation of the first programmable attenuator 461 causes the signal strength or power (e.g., the RSSI) of the wired or wireless signals sent between the root AP 430 and the client device 420 to be set accordingly. The attenuation of the second programmable attenuator 462 causes the signal strength or power (e.g., RSSI) of the wired or wireless signals sent between the extender AP 440 and the client device 420 to be set accordingly. The attenuation of the fourth programmable attenuator 664 causes the signal strength or power (e.g., RSSI) of the wired or wireless signals sent between the client device 420 and the second extender AP 650 to be set accordingly.

In step 1180, the attenuation of the first, second, and fourth programmable attenuators 461, 462, 664 and the corresponding signal strength setting of the wired or wireless signals between the root AP 430 and the client device 420, between the extender AP 440 and the client device 420, and between the client device 420 and the second extender AP 650 simulates and/or reproduces, from the perspective of the client device 420, the field location (e.g., of the wireless link monitor 210) in the field test environment 220. Additionally or alternatively, the corresponding signal strength setting of the wired or wireless signals of the wired or wireless signals sent between the root AP 430 and the client device 420, between the extender AP 440 and the client device 420, and/or between the client device 420 and the second extender AP 650 can simulate and/or reproduce the effective distance (e.g., effective RF distance) between the wireless link monitor 210 and the root AP 230, between the wireless link monitor 210 and the extender AP 231, and/or between the client device 420 and the second extender AP 650, respectively, at the field location of the wireless link monitor 210 in the field test environment 220.

In step 1190, the attenuation of the third, fifth, and sixth programmable attenuators 463, 665, 666 is set based on the third, fifth, and sixth control signals, respectively. The attenuation of the third programmable attenuator 463 causes the signal strength or power (e.g., the RSSI) of the wireless signals between the root AP 430 and the first extender AP 440 to be set accordingly. The attenuation of the fifth programmable attenuator 665 causes the signal strength or power (e.g., the RSSI) of the wireless signals sent between the root AP 430 and the second extender AP 650 to be set accordingly. The attenuation of the sixth programmable attenuator 666 causes the signal strength or power (e.g., the RSSI) of the wired or wireless signals sent between the first extender AP 440 and the second extender AP 650 to be set accordingly.

In step 1195, the signal strength or power of the wired or wireless signals sent between the root AP 430 and the first extender AP 440 simulates and/or reproduces the physical distance and/or one or more physical obstructions (e.g., the effective distance) between the root AP 230 and the first extender AP 231 in the field test environment 220. The signal strength or power of the wired or wireless signals sent between the root AP 430 and the second extender AP 650 simulates and/or reproduces the physical distance and/or one or more physical obstructions between the root AP 230 and the second extender AP 232 in the field test environment 220. The signal strength or power of the wired or wireless signals sent between the first extender AP 440 and the second extender AP 650 simulates and/or reproduces the physical distance and/or one or more physical obstructions between the first extender AP 231 and the second extender AP 232 in the field test environment 220. Thus, the signal strength or power of the wired or wireless signals sent between each mesh network node 430, 440, 650 reproduces the configuration of the mesh network nodes 230-232 in the field test environment 220.

The signal strength of the wired or wireless signals transmitted between the root AP 430 and the first extender AP 440, between the root AP 430 and the second extender AP 650, and between the first and second extender APs 440, 650 can reproduce, from the perspective of the root AP 230, the effective distance between the root AP 230 and the first extender AP 231 and between the root AP 230 and the second extender AP 232, which allows the field-to-lab testing system 60 to reproduce the same wireless mesh configuration as in the field test environment 220.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor, but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method for field-to-lab testing of a wireless device, comprising:
retrieving, with a computer operatively coupled to a non-transitory computer readable storage medium, (a) data representing a recording of a wireless field client device in a wireless field test environment and (b) data representing a physical configuration of the wireless field test environment, the wireless field test environment including a mesh network comprising:
a field wireless-root access point (AP); and
a field wireless-extender AP in wireless communication with the field wireless-root AP,
wherein:
the data representing the recording includes wireless path-loss measurements between the field wireless-root AP and the wireless field client device and between the field wireless-extender AP and the wireless field client device, and
the data representing the physical configuration of the wireless field test environment includes wireless path-loss measurements from the field wireless-root AP to the field wireless-extender AP and from the field wireless-extender AP to the field wireless-root AP;
sending one or more first control signals from the computer to a first programmable attenuator that is electrically coupled to a first signal line that provides a first data communication path between (a) a wireless laboratory client device located in a client electromagnetically-isolated chamber and (b) a laboratory wireless-root AP located in a root electromagnetically-isolated chamber, whereby the wireless laboratory client device and the laboratory wireless-root AP are in electrical communication to transmit root-client signals to each other;
sending one or more second control signals from the computer to a second programmable attenuator that is electrically coupled to a second signal line that provides a second data communication path between (a) the wireless laboratory client device and (b) a laboratory wireless-extender AP located in an extender electromagnetically-isolated chamber, whereby the wireless laboratory client device and the laboratory wireless-extender AP are in electrical communication to transmit extender-client signals to each other;
sending one or more third control signals from the computer to a third programmable attenuator that is electrically coupled to a third signal line that provides a third data communication path between (a) the laboratory wireless-root AP and (b) the laboratory wireless-extender AP, whereby the laboratory wireless-root AP and the laboratory wireless-extender AP are in electrical communication to transmit root-extender signals to each other;
setting a first attenuation produced by the first programmable attenuator according to the first control signal(s);
setting a second attenuation produced by the second programmable attenuator according to the second control signal(s); and
setting a third attenuation produced by the third programmable attenuator according to the third control signal(s);
wherein:
the first and second attenuations simulates a field location of the wireless laboratory client device in the wireless field test environment, and
the third attenuation simulates the physical configuration of the wireless field test environment.

2. The method of claim 1, further comprising setting (a) a signal strength of the root-extender signals and (b) a signal strength of the extender-client signals,
wherein:
the signal strength of the root-extender signals reproduces, from a perspective of the wireless laboratory client device, an effective distance between the wireless field client device and the field wireless-root AP at the field location of the wireless laboratory client device in the wireless field test environment, and
the signal strength of the extender-client signals reproduces, from the perspective of the wireless laboratory client device, an effective distance between the wireless field client device and the field wireless-extender AP at the field location of the wireless laboratory client device in the wireless field test environment.

3. The method of claim 2, further comprising setting a signal strength of the root-extender signals, wherein the signal strength of the root-extender signals reproduces, from a perspective of the laboratory wireless-root AP, an effective distance between the field wireless-root AP and the field wireless-extender AP in the wireless field test environment.

4. The method of claim 1, wherein:
the root-client signals are root-client laboratory signals,
the extender-client signals are extender-client laboratory signals, and
the method further comprises:
placing the wireless field client device at the field location in the wireless field test environment;
while the wireless field client device is at the field location, repeatedly measuring with the wireless field client device: (a) a signal strength of root-client field wireless signals sent between the field wireless-root AP and the wireless field client device and (b) a signal strength of extender-client field wireless signals sent between the field wireless-extender AP and the wireless field client device; and
storing signal strength measurements of the root-client field wireless signals and of the extender-client field wireless signals in non-transitory memory operatively coupled to the wireless field client device.

5. The method of claim 1, wherein:
the data representing the recording includes wireless path-loss measurements, as the wireless field client device is moved along a path in the wireless field test environment, between the field wireless-root AP and the wireless field client device and between the field wireless-extender AP and the wireless field client device, and
the method further comprises:
simultaneously varying (a) the first attenuation with respect to time produced by the first programmable attenuator according to the first control signals and (b) the second attenuation with respect to time produced by the second programmable attenuator according to the second control signals,
wherein a simultaneous variation of the first and second attenuations with respect to time simulates a movement of the wireless laboratory client device along the path through the wireless field test environment.

6. The method of claim 5, further comprising simultaneously varying (a) a signal strength, with respect to time, of the root-client signals and (b) a signal strength, with respect to time, of the extender-client signals,
wherein a simultaneous variation of the signal strength of the root-client signals and of the signal strength of the extender-client signals reproduces, from the perspective of the wireless laboratory client device, the movement of the wireless field client device along the path through the wireless field test environment.

7. The method of claim 5, wherein:
the root-client signals are root-client laboratory signals,
the extender-client signals are extender-client laboratory signals, and
the method further comprises:
moving the wireless field client device along the path through the wireless field test environment;
while moving the wireless field client device along the path, repeatedly measuring with the wireless field client device: (a) a signal strength of root-client field wireless signals sent between the field wireless-root AP and the wireless field client device and (b) a signal strength of extender-client field wireless signals sent between the field wireless-extender AP and the wireless field client device; and
storing signal strength measurements of the root-client field wireless signals and of the extender-client field wireless signals in non-transitory memory operatively coupled to the wireless field client device.

8. The method of claim 7, further comprising:
moving the wireless field client device to within a predetermined radius of the field wireless-root AP;
while the wireless field client device is within the predetermined radius of the field wireless-root AP, measuring a signal strength of extender field wireless signals sent from the field wireless-extender AP to the field wireless-root AP;
moving the wireless field client device to within a predetermined radius of the field wireless-extender AP;
while the wireless field client device is within the predetermined radius of the field wireless-extender AP, measuring a signal strength of root field wireless signals sent from the field wireless-root AP to the field wireless-extender AP; and
storing signal strength measurements of the root field wireless signals and of the extender field wireless signals in the non-transitory memory operatively coupled to the wireless field client device.

9. The method of claim 8, wherein the path passes through the predetermined radius of the field wireless-root AP and the predetermined radius of the field wireless-extender AP.

10. The method of claim 5, wherein:
the field wireless-extender AP is a first field wireless-extender AP,
the laboratory wireless-extender AP is a first laboratory wireless-extender AP, the extender-client signals are first-extender-client signals, the root-extender signals are root-first-extender signals, the extender electromagnetically-isolated chamber is a first extender electromagnetically-isolated chamber, the wireless field test environment includes a second field wireless-extender AP in wireless communication with the field wireless-root AP and the first wireless-extender AP, the data representing the recording further includes wireless path-loss measurements, as the wireless field client device is moved along the path, between the second field wireless-root AP and wireless field client device, between the second field wireless-extender AP and the wireless field client device, and between the first and second field wireless-root APs, the data representing the configuration of the wireless field test environment further includes wireless path-loss measurements from the field wireless-root AP to the second field wireless-extender AP, from the second field wireless-extender AP to the field wireless-root AP, from the first field wireless-extender AP to the second field wireless-extender AP, and second field wireless-extender AP to the first field wireless-extender AP, and the method further comprises:
sending fourth control signals from the computer to a fourth programmable attenuator that is electrically coupled to a fourth signal line, the fourth signal line electrically coupling (a) the wireless laboratory client device and (b) a second laboratory wireless-extender AP located in a second extender electromagnetically-isolated chamber, whereby the wireless laboratory client device and the second laboratory wireless-extender AP are in electrical communication to transmit second-extender-client signals to each other;

sending one or more fifth control signals from the computer to a fifth programmable attenuator that is electrically coupled to a fifth signal line, the fifth signal line electrically coupling (a) the laboratory wireless-root AP and (b) the second laboratory wireless-extender AP, whereby the laboratory wireless-root AP and the second laboratory wireless-extender AP are in electrical communication to transmit second-extender-root signals to each other;

sending one or more sixth control signals from the computer to a sixth programmable attenuator that is electrically coupled to a sixth signal line, the sixth signal line electrically coupling (a) the first laboratory wireless-extender AP (b) the second laboratory wireless-extender AP, whereby the first laboratory wireless-extender AP and the second laboratory wireless-extender AP are in electrical communication to transmit first-extender-second-extender signals to each other;

simultaneously varying (a) the first attenuation with respect to time, (b) the second attenuation with respect to time, and (c) a fourth attenuation with respect to time produced by the fourth programmable attenuator according to the fourth control signals;

setting a fifth attenuation produced by the fifth programmable attenuator according to the fifth control signal(s); and setting a sixth attenuation produced by the sixth programmable attenuator according to the sixth control signal(s), wherein:
the simultaneous variation of the first, second, and fourth attenuations with respect to time simulates the movement of the wireless laboratory client device along the path through the wireless field test environment, and the third, fifth, and sixth attenuations simulate the physical configuration of the wireless field test environment.

11. A system for field-to-lab testing of a wireless device, comprising:
a wireless laboratory client device located in a client electromagnetically-isolated chamber;
a laboratory wireless-root access point (AP) located in a root electromagnetically-isolated chamber;
a laboratory wireless-extender AP located in an extender electromagnetically-isolated chamber;
a first signal line that provides a first data communication path between (a) the wireless laboratory client device and (b) the laboratory wireless-root AP;
a first programmable attenuator electrically coupled to the first signal line;
a second signal line that provides a second data communication path between (a) the wireless laboratory client device and (b) the laboratory wireless-extender AP;
a second programmable attenuator electrically coupled to the second signal line;
a third signal line that provides a third data communication path between (a) the laboratory wireless-root AP and (b) the laboratory wireless-extender AP;
a third programmable attenuator electrically coupled to the third signal line;
a computer in electrical communication with first, second, and third programmable attenuators, the computer operatively coupled to a non-transitory computer readable storage medium that includes (a) data representing a recording of a wireless field client device in a wireless field test environment and (b) data representing a physical configuration of the wireless field test environment, the wireless field test environment including:
a field wireless-root AP; and
a field wireless-extender AP in wireless communication with the field wireless-root AP,
wherein:
the data representing the recording includes wireless path-loss measurements between the field wireless-root AP and the wireless field client device and between the field wireless-extender AP and the wireless field client device,
the data representing the physical configuration of the wireless field test environment includes wireless path-loss measurements between the field wireless-root AP and the field wireless-extender AP and between the field wireless-extender AP and the field wireless-root AP, and the computer is configured to:
send one or more first control signals to the first programmable attenuator to set a first attenuation produced by the first programmable attenuator,
send one or more second control signals to the second programmable attenuator to set a second attenuation produced by the second programmable attenuator, and
send one or more third control signals to the third programmable attenuator, wherein:
the first and second attenuations simulates a field location of the wireless laboratory client device in the wireless field test environment, and
the third attenuation simulates the physical configuration of the wireless field test environment.

12. The system of claim 11, wherein:
the first attenuation sets a signal strength of the root-extender signals,
the second attenuation sets a signal strength of the extender-client signals,
the third attenuation sets a signal strength of the root-extender signals,
the signal strength of the root-extender signals reproduces, from a perspective of the wireless laboratory client device, an effective distance between the wireless field client device and the field wireless-root AP at the field location of the wireless laboratory client device in the wireless field test environment,
the signal strength of the extender-client signals reproduces, from the perspective of the wireless laboratory client device, an effective distance between the wireless field client device and the field wireless-extender AP at the field location of the wireless laboratory client device in the wireless field test environment, and
the signal strength of the root-extender signals reproduces, from a perspective of the laboratory wireless-root AP, an effective distance between the field wireless-root AP and the field wireless-extender AP in the wireless field test environment.

13. The system of claim 11, wherein the wireless field client device comprises a wireless link monitor.

14. The system of claim 11, wherein:
the data representing the recording includes wireless path-loss measurements, as the wireless field client device is moved along a path in the wireless field test environment, between the field wireless-root AP and the wireless field client device and between the field wireless-extender AP and the wireless field client device,
the first and second control signals cause the first and second programmable attenuators to simultaneously vary the first and second attenuations with respect to time, and
a simultaneous variation of the first and second attenuations, with respect to time, simulates a movement of the wireless laboratory client device along the path through the wireless field test environment.

15. The system of claim 14, wherein:
the simultaneous variation of the first and second attenuations, with respect to time, causes a simultaneous variation of (a) a signal strength, with respect to time, of the root-client signals and (b) a signal strength, with respect to time, of the extender-client signals, and
the simultaneous variation of (a) a signal strength, with respect to time, of the root-client signals and (b) a signal strength, with respect to time, of the extender-client signals reproduces, from the perspective of the wireless laboratory client device, a movement of the wireless field client device along the path through the wireless field test environment.

16. The system of claim 14, wherein:
the field wireless-extender AP is a first field wireless-extender AP,
the laboratory wireless-extender AP is a first laboratory wireless-extender AP,
the extender-client signals are first-extender-client signals,
the root-extender signals are root-first-extender signals,
the extender electromagnetically-isolated chamber is a first extender electromagnetically-isolated chamber,
the wireless field test environment includes a second field wireless-extender AP in wireless communication with the field wireless-root AP and the first wireless-extender AP,
the data representing the recording further includes wireless path-loss measurements, as the wireless field client device is moved along the path, between the second field wireless-root AP and the wireless field client device, between the first field wireless-extender AP and the wireless field client device, and between the field wireless-root AP and the wireless field client device,
the data representing the configuration of the wireless field test environment further includes wireless path-loss measurements between the field wireless-root AP and the first field wireless-extender AP, between the field wireless-root AP and the second field wireless-extender AP, and between the first field wireless-extender AP and the second field wireless-extender AP, and
the system further comprises:
a second laboratory wireless-extender AP located in a second extender electromagnetically-isolated chamber,
a fourth signal line that provides a data communication path between (a) the wireless laboratory client device and (b) the second laboratory wireless-extender AP, whereby the wireless laboratory client device and the second laboratory wireless-extender AP are in electrical communication to transmit second-extender-client signals to each other;
a fourth programmable attenuator electrically coupled to the fourth signal line;
a fifth signal line that provides a data communication path between (a) the laboratory wireless-root AP and (b) the second laboratory wireless-extender AP, whereby the laboratory wireless-root AP and the second laboratory wireless-extender AP are in electrical communication to transmit second-extender-root signals to each other;
a fifth programmable attenuator electrically coupled to the fifth signal line, the fifth programmable attenuator producing a fifth attenuation;
a sixth signal line that provides a data communication path between (a) the first laboratory wireless-extender AP and (b) the second laboratory wireless-extender AP, whereby the first laboratory wireless-extender AP and the second laboratory wireless-extender AP are in electrical communication to transmit first-extender-second-extender signals to each other,
wherein the computer is further configured to:
send fourth control signals to the fourth programmable attenuator to vary a fourth programmable attenuation, with respect to time, produced by the fourth programmable attenuator;
send one or more fifth control signals to the fifth programmable attenuator to set a fifth attenuation produced by the fifth programmable attenuator, and
send one or more sixth control signals to the sixth programmable attenuator to set a sixth attenuation produced by the sixth programmable attenuator, wherein:
the first, second, and fourth control signals cause the first, second, and fourth attenuations, respectively, to vary simultaneously, with respect to time, to simulate the movement of the wireless laboratory client device along the path through the wireless field test environment, and
the third, fifth, and sixth attenuations simulate the physical configuration of the wireless field test environment.

17. The system of claim 11, further comprising:
a first client antenna disposed in the client electromagnetically-isolated chamber, the first client antenna electrically coupled to the first signal line;
a first root antenna disposed in the root electromagnetically-isolated chamber, the first root antenna electrically coupled to the first signal line;
a second client antenna disposed in the client electromagnetically-isolated chamber, the second client antenna electrically coupled to the second signal line;
a first extender antenna disposed in the extender electromagnetically-isolated chamber, the first extender antenna electrically coupled to the second signal line;
a second root antenna disposed in the root electromagnetically-isolated chamber, the second root antenna electrically coupled to the third signal line; and
a second extender antenna disposed in the extender electromagnetically-isolated chamber, the second extender antenna electrically coupled to the third signal line,
whereby the wireless laboratory client device, the laboratory wireless-root AP, and the laboratory wireless-extender AP are in wireless communication with each other.

18. The system of claim 11, wherein:
the first signal line is electrically connected to a first port in the wireless laboratory client device and a first port in the laboratory wireless-root AP,
the second signal line is electrically connected to a second port in the wireless laboratory client device and a first port in the laboratory wireless-extender AP, and
the third signal line is electrically connected to a second port in the laboratory wireless-root AP and a second port in the laboratory wireless-extender AP,
whereby the wireless laboratory client device, the laboratory wireless-root AP, and the laboratory wireless-extender AP are in wired communication with each other.

19. A computer program product comprising computer-readable instructions that, when executed by a processor, cause the processor to:
retrieve, with a computer operatively coupled to a non-transitory computer readable storage medium, (a) data representing a recording of a wireless field client device in a wireless field test environment and (b) data representing a physical configuration of the wireless field test environment, the wireless field test environment including a mesh network comprising:
a field wireless-root access point (AP); and
a field wireless-extender AP in wireless communication with the field wireless-root AP,
wherein:
the data representing the recording includes wireless path-loss measurements between the field wireless-root AP and the wireless field client device and between the field wireless-extender AP and the wireless field client device, and
the data representing the physical configuration of the wireless field test environment includes wireless path-loss measurements from the field wireless-root AP to the field wireless-extender AP and from the field wireless-extender AP to the field wireless-root AP;
send one or more first control signals from the computer to a first programmable attenuator that is electrically coupled to a first signal line that provides a first data communication path between (a) a wireless laboratory client device located in a client electromagnetically-isolated chamber and (b) a laboratory wireless-root AP located in a root electromagnetically-isolated chamber, whereby the wireless laboratory client device and the laboratory wireless-root AP are in electrical communication to transmit root-client signals to each other;
send one or more second control signals from the computer to a second programmable attenuator that is electrically coupled to a second signal line that provides a second data communication path between (a) the wireless laboratory client device and (b) a laboratory wireless-extender AP located in an extender electromagnetically-isolated chamber, whereby the wireless laboratory client device and the laboratory wireless-extender AP are in electrical communication to transmit extender-client signals to each other;
send one or more third control signals from the computer to a third programmable attenuator that is electrically coupled to a third signal line that provides a third data communication path between (a) the laboratory wireless-root AP and (b) the laboratory wireless-extender AP, whereby the laboratory wireless-root AP and the laboratory wireless-extender AP are in electrical communication to transmit root-extender signals to each other;
set a first attenuation produced by the first programmable attenuator according to the first control signal(s);
set a second attenuation produced by the second programmable attenuator according to the second control signal(s); and
set a third attenuation produced by the third programmable attenuator according to the third control signal(s),
wherein:
the first and second attenuations simulates a field location of the wireless laboratory client device in the wireless field test environment, and
the third attenuation simulates the physical configuration of the wireless field test environment.

20. The computer program product of claim 19, wherein:
the data representing the recording includes wireless path-loss measurements, as the wireless field client device is moved along a path in the wireless field test environment, between the field wireless-root AP and the wireless field client device and between the field wireless-extender AP and the wireless field client device, and
the instructions further cause the processor to:
simultaneously vary (a) the first attenuation with respect to time produced by the first programmable attenuator according to the first control signals and (b) the second attenuation with respect to time produced by the second programmable attenuator according to the second control signals,
wherein a simultaneous variation of the first and second attenuations with respect to time simulates a movement of the wireless laboratory client device along the path through the wireless field test environment.

* * * * *